(12) United States Patent
Ker

(10) Patent No.: US 11,312,194 B2
(45) Date of Patent: Apr. 26, 2022

(54) LAND AND AERIAL TRANSPORTATION VEHICLE AND POWERTRAIN THEREOF

(71) Applicant: Zhen Gang Ker, Singapore (SG)

(72) Inventor: Zhen Gang Ker, Singapore (SG)

( * ) Notice: Subject to any disclaimer, the term of this patent is extended or adjusted under 35 U.S.C. 154(b) by 0 days.

(21) Appl. No.: 17/044,246

(22) PCT Filed: Nov. 29, 2019

(86) PCT No.: PCT/SG2019/050587
§ 371 (c)(1),
(2) Date: Sep. 30, 2020

(87) PCT Pub. No.: WO2021/107859
PCT Pub. Date: Jun. 3, 2021

(65) Prior Publication Data
US 2021/0309059 A1    Oct. 7, 2021

(51) Int. Cl.
*B60F 5/02*            (2006.01)
*B64C 37/00*           (2006.01)
(Continued)

(52) U.S. Cl.
CPC .............. *B60F 5/02* (2013.01); *B60K 6/24* (2013.01); *B60K 6/26* (2013.01); *B60K 6/365* (2013.01);
(Continued)

(58) Field of Classification Search
CPC .......... B64C 37/00; B60F 5/02; B64D 27/24; B64D 2027/026; B64D 35/02; B64D 35/06; F04D 29/563
See application file for complete search history.

(56) References Cited

U.S. PATENT DOCUMENTS 5,141,173 A * 8/1992 Lay .................. B64C 37/00
                                              244/2
5,836,541 A * 11/1998 Pham ................ B60F 5/02
                                              244/2
(Continued)

FOREIGN PATENT DOCUMENTS

CA        2652170       12/2007
CN        204109715 U   1/2015
(Continued)

OTHER PUBLICATIONS

Supplementary European Search Report for EP Application No. 19919551 "Land and Aerial Transportation Vehicle and Powertrain thereof" dated Feb. 16, 2021.
(Continued)

*Primary Examiner* — Philip J Bonzell
*Assistant Examiner* — Michael B. Kreiner
(74) *Attorney, Agent, or Firm* — Hamilton, Brook, Smith & Reynolds, P.C.

(57) ABSTRACT

A powertrain including an engine; a main drive shaft assembly; a primary clutch mechanism coupled to the engine and the a main drive shaft assembly, the primary clutch mechanism being operable to connect or disconnect the main drive shaft assembly and the engine; an axle shaft coupled transversely to the main drive shaft assembly; a secondary clutch mechanism having a driving member coupled to an end of the axle shaft; a drive wheel coupled to a first driven member of the secondary clutch mechanism; and an air propulsion unit coupled to a second driven member of the secondary clutch mechanism. The secondary clutch mechanism being operable to engage or disengage the first driven member and/or the second driven member to the driving member so as to connect or disconnect the drive wheel and/or the air
(Continued)

propulsion unit to the axle shaft. A vehicle including the powertrain.

20 Claims, 12 Drawing Sheets

(51) Int. Cl.
| | |
|---|---|
| B60K 6/24 | (2007.10) |
| F04D 29/56 | (2006.01) |
| B60K 6/26 | (2007.10) |
| B60K 6/365 | (2007.10) |
| B60K 6/38 | (2007.10) |
| B64D 27/24 | (2006.01) |
| B64D 35/02 | (2006.01) |
| B64D 35/06 | (2006.01) |
| F01D 5/14 | (2006.01) |
| B64D 27/02 | (2006.01) |
| F04D 19/00 | (2006.01) |

(52) U.S. Cl.
CPC ............... *B60K 6/38* (2013.01); *B64C 37/00* (2013.01); *B64D 27/24* (2013.01); *B64D 35/02* (2013.01); *B64D 35/06* (2013.01); *F01D 5/141* (2013.01); *F04D 29/563* (2013.01); *B60Y 2200/40* (2013.01); *B60Y 2200/92* (2013.01); *B64D 2027/026* (2013.01); *F04D 19/007* (2013.01)

(56) References Cited

U.S. PATENT DOCUMENTS

| | | | | |
|---|---|---|---|---|
| 5,915,649 | A | * | 6/1999 | Head ...................... B64C 37/00 |
| | | | | 244/7 A |
| 8,469,858 | B2 | | 6/2013 | Yang et al. |
| 9,446,844 | B2 | | 9/2016 | Jung |
| 2003/0094536 | A1 | | 5/2003 | LaBiche |
| 2008/0048065 | A1 | * | 2/2008 | Kuntz ................... B64C 39/024 |
| | | | | 244/17.23 |
| 2011/0192931 | A1 | | 8/2011 | Jung |
| 2015/0102155 | A1 | * | 4/2015 | Krastev ................. B60K 16/00 |
| | | | | 244/2 |
| 2016/0023527 | A1 | | 1/2016 | Dietrich |
| 2016/0207368 | A1 | * | 7/2016 | Gaonjur ................. B64C 37/00 |
| 2016/0229534 | A1 | * | 8/2016 | Hutson .................... B64C 27/08 |
| 2016/0311282 | A1 | * | 10/2016 | Nam ....................... B64C 25/36 |
| 2017/0217586 | A1 | * | 8/2017 | Goelet .................... A01G 15/00 |
| 2018/0135420 | A1 | * | 5/2018 | Surace .................. F04D 29/582 |
| 2019/0120077 | A1 | * | 4/2019 | Kempshall .............. B64C 25/34 |
| 2019/0121371 | A1 | * | 4/2019 | Russell ................ G08G 5/0013 |
| 2019/0232745 | A1 | * | 8/2019 | Kharitonov ............... B60F 5/02 |
| 2020/0023701 | A1 | * | 1/2020 | Salem .................... B64C 11/001 |
| 2020/0172234 | A1 | * | 6/2020 | Neff ........................ B64C 25/66 |
| 2020/0207469 | A1 | * | 7/2020 | Benedict ................. B64C 37/00 |
| 2021/0229512 | A1 | * | 7/2021 | Opalinski ............. B60W 20/10 |

FOREIGN PATENT DOCUMENTS

| | | | | | |
|---|---|---|---|---|---|
| CN | 104369635 | A | * | 2/2015 | ............... B60F 5/02 |
| CN | 104385846 | A | * | 3/2015 | |
| CN | 204488375 | U | * | 7/2015 | |
| CN | 105835640 | A | * | 8/2016 | |
| CN | 107856488 | | | 3/2018 | |
| CN | 207942888 | U | * | 10/2018 | |
| CN | 109249768 | A | * | 1/2019 | |
| CN | 109624689 | | | 4/2019 | |
| CN | 109849603 | A | * | 6/2019 | |
| DE | 102019120492 | B3 | * | 7/2020 | ............... B60F 5/02 |
| GB | 2454531 | A | | 5/2009 | |
| JP | 2016222216 | A | | 12/2016 | |
| TW | 201026562 | A1 | | 7/2010 | |
| WO | 2018108949 | | | 6/2018 | |

OTHER PUBLICATIONS

International Search Report for International Application No. PCT/SG2019/050587, "Land and Aerial Transportation Vehicle and Powertrain thereof", dated Jan. 30, 2020.
Written Opinion for International Application No. PCT/SG2019/050587, "Land and Aerial Transportation Vehicle and Powertrain thereof", dated Jan. 31, 2020.
International Preliminary Report on Patentability for International Application No. PCT/SG2019/050587, "Land and Aerial Transportation Vehicle and Powertrain thereof", dated Jul. 27, 2020.
Examination Report issued in Australian Application No. 2019441822, entitled "Land and Aerial Transportation Vehicle and Powertrain thereof," Date of Search Completed Dec. 1, 2020 (4 pages).

* cited by examiner

LAND AND AERIAL TRANSPORTATION VEHICLE AND POWERTRAIN THEREOF

This application is the U.S. National Stage of International Application No. PCT/SG2019/050587, filed Nov. 29, 2019. The entire teachings of the above application are incorporated herein by reference.

TECHNICAL FIELD

Various embodiments generally relate to a land and aerial transportation vehicle, a powertrain for the vehicle, and an axle assembly for the vehicle. In particular, various embodiments generally relate to a flying car, a powertrain for the flying car, and an axle assembly for the flying car.

BACKGROUND

In recent years, various models of flying cars have been commercialized in the market. For example, the PAL-V flying car features a dual engine configuration with dual drivetrain, using one engine for driving on the road and one for flying in the air. As another example, the Aeromobil flying car feature a generator/engine to run two separate mode via one switching mechanism switchable between powering the propeller for flight and powering a pair of electric motors for driving. However, if the switching mechanism fails, there is no alternative ways to operate the flying car. As can be seen, these flying cars either have separate powertrain for driving and flying, or have one generator/engine switchable between driving separate drivetrain for flying and driving. Thus, they generally have multiple drivetrain taking up excess weight and space, as well as a lack of backup in case of propulsion failure for land and air travel.

Accordingly, there is a need for a more effective powertrain solution without compromising performance for cost for vehicle capable of land and aerial transportation so as to address the above issues.

SUMMARY

According to various embodiments, there is provided a powertrain for a vehicle capable of land and aerial transportation. The powertrain may include an engine having at least one output shaft. The powertrain may include a primary clutch mechanism coupled to the at least one output shaft of the engine in a manner such that a driving member of the primary clutch mechanism is rotatable by the at least one output shaft of the engine. The powertrain may include a main drive shaft assembly coupled to a driven member of the primary clutch mechanism. The primary clutch mechanism may be operable to engage or disengage the driven member of the primary clutch mechanism and the driving member of the primary clutch mechanism so as to connect or disconnect the main drive shaft assembly and the at least one output shaft of the engine. The powertrain may include an axle shaft coupled transversely to the main drive shaft assembly and driven by the main drive shaft assembly. The powertrain may include a secondary clutch mechanism coupled to an end of the axle shaft in a manner such that a driving member of the secondary clutch mechanism is rotatable by the axle shaft. The powertrain may include a drive wheel coupled to a first driven member of the secondary clutch mechanism. The secondary clutch mechanism may be operable to engage or disengage the first driven member of the secondary clutch mechanism and the driving member of the secondary clutch mechanism so as to connect or disconnect the drive wheel and the axle shaft. The powertrain may include an air propulsion unit coupled to a second driven member of the secondary clutch mechanism. The secondary clutch mechanism may be operable to engage or disengage the second driven member of the secondary clutch mechanism and the driving member of the secondary clutch mechanism so as to connect or disconnect the air propulsion unit and the axle shaft.

According to various embodiments, there is provided a land and aerial transportation vehicle. The land and aerial transportation vehicle may include a powertrain as described herein. The land and aerial transportation vehicle may include a plurality of wheels. According to various embodiments, at least one of the wheels may be the drive wheel which is provided for driving the vehicle on land. The land and aerial transportation vehicle may include at least the one air propulsion unit for providing lift and/or forward propulsion for aerial travel of the vehicle.

According to various embodiments, there is provided an axle assembly for a vehicle capable of land and aerial transportation. The axle assembly may include an axle shaft. The axle assembly may include a clutch mechanism coupled to an end of the axle shaft in a manner such that a driving member of the clutch mechanism is rotatable by the axle shaft. The axle assembly may include a drive wheel coupled to a first driven member of the clutch mechanism. The clutch mechanism may be operable to engage or disengage the first driven member of the clutch mechanism and the driving member of the clutch mechanism so as to connect or disconnect the drive wheel and the axle shaft. The axle assembly may include an air propulsion unit coupled to a second driven member of the clutch mechanism. The clutch mechanism may be operable to engage or disengage the second driven member of the clutch mechanism and the driving member of the clutch mechanism so as to connect or disconnect the air propulsion unit and the axle shaft.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DETAILED DESCRIPTION

Figure 1A:
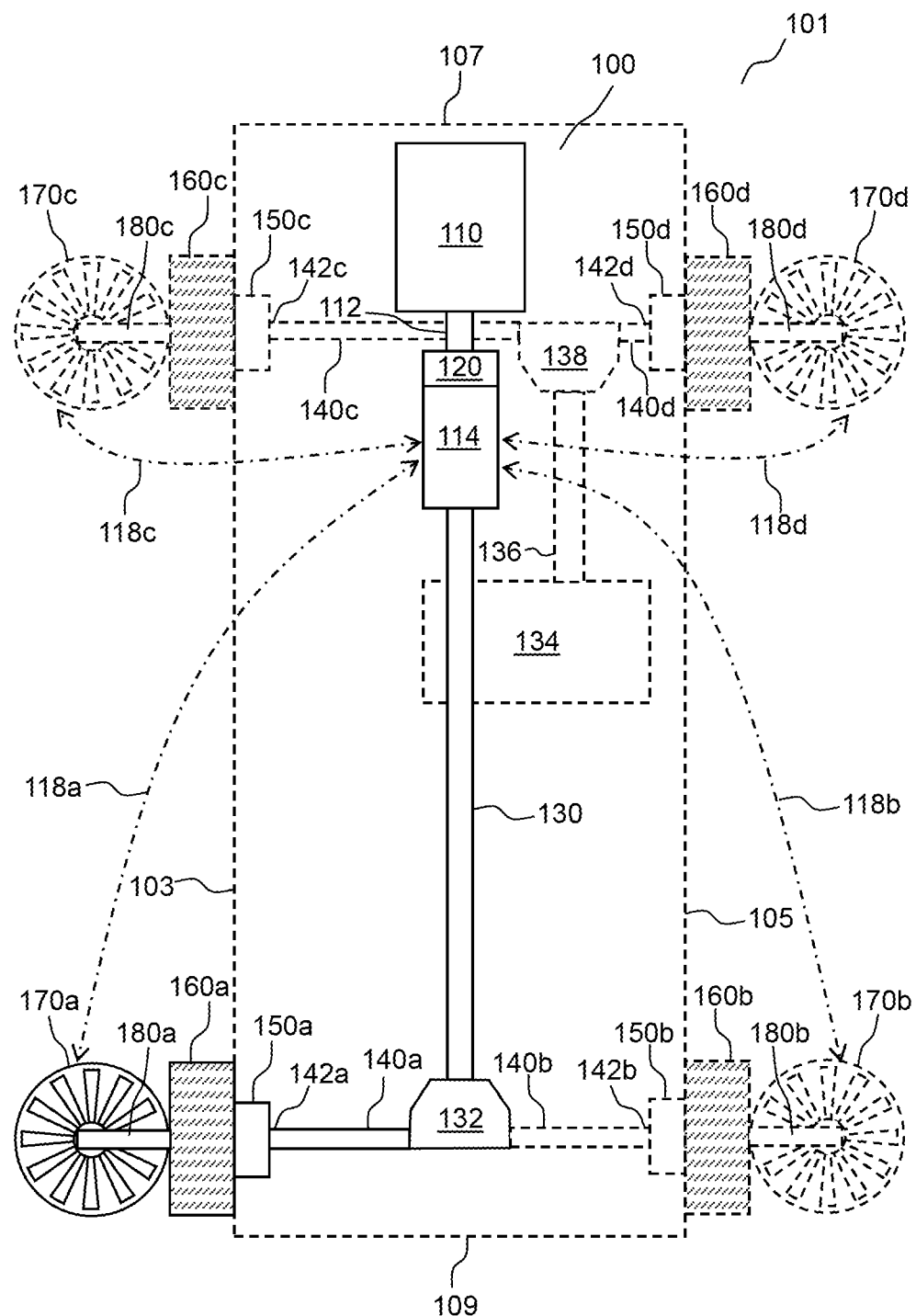
FIG. 1A shows a schematic diagram of a powertrain for a vehicle capable of land and aerial transportation according to various embodiments.

Embodiments described below in the context of the apparatus are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments generally relate to a powertrain for a vehicle capable of land and aerial transportation, and a land and aerial transportation vehicle. In particular, various embodiments generally relate to a powertrain for a flying car, and a flying car. According to various embodiments, a powertrain may include all components used to transform energy, such as mechanical energy, potential energy, electrical energy, chemical energy, solar energy, nuclear energy, into kinetic energy for propulsion purposes. According to various embodiments a vehicle capable of land and aerial transportation or a flying car may be a roadable aircraft or a vehicle that provides transportation by both ground and air or a vehicle that is capable of being driven on a road and flown in the air or a multi-mode transport vehicle for ground travel and air travel.

Various embodiments have provided a powertrain that allows any vehicle to achieve flight, while at the same time able to drive on land. According to various embodiments, the powertrain is readily switchable between electrical and mechanical operations as redundancy to serve as backup or fail-safe for each other. According to various embodiments, the electrical and mechanical components of the powertrain are integrated to operate within a single combined axis or drive shaft. According to various embodiments, the powertrain may allow the use of any or a combination or electrical actuator, mechanical actuators, hydraulic actuators, pneumatic actuators or other suitable actuators to switch between both modes as a safety requirement. According to various embodiments, the powertrain may allow for a true dual redundancy safety system, whereby if all electrical systems fail the vehicle may still be maneuvered using just the engines, vice versa, regardless on land or air.

According to various embodiments, the powertrain may include an onboard power generator to provide the electrical power required without being limited by the size or capacity of a battery. According to various embodiments, the powertrain may include at least one engine, with at least one electrical generator coupled thereto, and a mechanical driveshaft, using a planetary gear array for interconnecting the components. According to various embodiments, the at least one electrical generator may serve as a secondary power generation system. According to various embodiments, the at least one electrical generator may be coupled to the mechanical driveshaft via a clutch mechanism or via a torque transfer gearbox. According to various embodiments, the powertrain may also include an array of electrical motors with their axis aligned in a parallel manner, allowing thrust to be produced in the same direction. According to various embodiments, the electrical power generated by the at least one electrical generator may be used to provide power to the array of electrical motors that provide additional torque to the powertrain. The electrical power generated may also be used to charge batteries which in turn provide electrical power to the array of electrical motors. According to various embodiments, the array of electrical motors may be coupled to driving fans which are compressive in nature or propellers to produce thrust. According to various embodiments, the fans may be arranged to face vertically and horizontally. According to various embodiments, the vertically arranged fans may produce thrust in the vertical direction for generating lift.

According to various embodiments, the powertrain may enable travel via multi-modes. For example, the powertrain may enable travel via four different modes of operation, namely, flight in electrical mode, flight in mechanical mode, land travel in electrical mode, and land travel in mechanical mode. As another example, the powertrain may enable travel via six different modes of operation, namely, flight in electrical mode, flight in mechanical mode, flight in hybrid mode, land travel in electrical mode, land travel in mechanical mode, and land travel in hybrid mode.

According to various embodiments, for flight in electrical mode, fans which are actuated by electrical motors and which are facing in the vertical direction are responsible for generating lift. Further, fans which are actuated by electrical motors and which are facing in the horizontal direction are responsible for generating forward thrust. Directional movement of the vehicle may be achieved via the final stator assembly of the vertical fans, whereby exit vents on the side of respective nacelle may open up to allow thrust to be directed in the lateral direction.

According to various embodiments, for flight in mechanical mode, the same vertical fans may be coupled to the main transmission drive. According to various embodiments, vertical fans may be coupled via gears, chain, belt, etc. to the main transmission drive.

According to various embodiments, for flight in hybrid mode, flight may be achieved by the simultaneous operation of the flight in electrical mode and flight in mechanical mode, whereby torque transfer of both modes are summated via torque transfer mechanisms.

According to various embodiments, for land travel in electrical mode, the electrical motors for the horizontal fans may be coupled to the main transmission drive via a power transfer assembly.

According to various embodiments, for land travel in mechanical mode, the engine may be mechanically coupled to a clutch which engages the main transmission drive to directly drive the wheels.

According to various embodiments, for land travel in hybrid mode, land travel may be achieved by the simultaneous operation of the land travel in electrical mode and land travel in mechanical mode, whereby torque transfer of both modes are summated via torque transfer mechanisms.

The following examples pertain to various embodiments.

Example 1 is a powertrain for a vehicle capable of land and aerial transportation, the powertrain including:

an engine having at least one output shaft;

a primary clutch mechanism coupled to the at least one output shaft of the engine in a manner such that a driving member of the primary clutch mechanism is rotatable by the at least one output shaft of the engine;

a main drive shaft assembly coupled to a driven member of the primary clutch mechanism, wherein the primary clutch mechanism is operable to engage or disengage the driven member of the primary clutch mechanism and the driving member of the primary clutch mechanism so as to connect or disconnect the main drive shaft assembly and the at least one output shaft of the engine;

an axle shaft coupled transversely to the main drive shaft assembly and driven by the main drive shaft assembly;

a secondary clutch mechanism coupled to an end of the axle shaft in a manner such that a driving member of the secondary clutch mechanism is rotatable by the axle shaft;

a drive wheel coupled to a first driven member of the secondary clutch mechanism, wherein the secondary clutch mechanism is operable to engage or disengage the first driven member of the secondary clutch mechanism and the driving member of the secondary clutch mechanism so as to connect or disconnect the drive wheel and the axle shaft; and an air propulsion unit coupled to a second driven member of the secondary clutch mechanism, wherein the secondary clutch mechanism is operable to engage or disengage the second driven member of the secondary clutch mechanism and the driving member of the secondary clutch mechanism so as to connect or disconnect the air propulsion unit and the axle shaft.

In Example 2, the subject matter of Example 1 may optionally include that the powertrain may include a generator coupled to the engine in a manner so as to be powered by the engine.

In Example 3, the subject matter of Example 2 may optionally include that the primary clutch mechanism may include a further driven member, wherein a rotor of the generator is coupled to the further driven member of the primary clutch mechanism, wherein the primary clutch mechanism is operable to engage or disengage the further driven member of the primary clutch mechanism and the driving member of the primary clutch mechanism so as to connect or disconnect the rotor of the generator and the at least one output shaft of the engine.

In Example 4, the subject matter of Example 2 or 3 may optionally include that a connection arrangement between the air propulsion unit and the secondary clutch mechanism may include:

a transfer shaft with a first end coupled to the second driven member of the secondary clutch mechanism;

a planetary gear set with a sun gear coupled to a second end of the transfer shaft;

an electric hub motor mounted to the transfer shaft, the electric hub motor operable to rotate a hub motor body relative to the transfer shaft and about a longitudinal axis of the transfer shaft, wherein a ring gear of the planetary gear set is coupled to the hub motor body, wherein a planet carrier connecting respective centres of planet gears of the planetary gear set is coupled to the air propulsion unit, and wherein the electric hub motor is electrically coupled to the generator.

In Example 5, the subject matter of Example 4 may optionally include that the electric hub motor is electrically coupled to a battery which is connected to the generator.

In Example 6, the subject matter of any one of Examples 1 to 5 may optionally include that the air propulsion unit may include a thrust fan unit oriented with a fan-blade-rotational-axis perpendicular to a rotational axis of the drive wheel in a manner so as to be capable of generating a thrust providing vertical lift.

In Example 7, the subject matter of Example 6 may optionally include that a converter mechanism may be connected between the thrust fan unit and the second driven member of the secondary clutch mechanism, wherein the converter mechanism may convert a rotation about a rotational axis of the second driven member to a rotation about the fan-blade-rotational-axis of the thrust fan unit.

In Example 8, the subject matter of Example 7 may optionally include that the connection arrangement may further include the converter mechanism, the converter mechanism being connected between the planet carrier of the planetary gear set and the thrust fan unit.

In Example 9, the subject matter of Example 7 or 8 may optionally include that the converter mechanism may include a bevel gear arrangement or a worm gear arrangement.

In Example 10, the subject matter of any one of Examples 6 to 9 may optionally include that the thrust fan unit may include multiple fan stages arranged in series.

In Example 11, the subject matter of Example 10 may optionally include that the multiple fan stages may be arranged in a manner such that alternate fan stages may be counter-rotating.

In Example 12, the subject matter of Example 11 may optionally include that one or more gearbox of the multiple fan stages may be configured and arranged such that alternate fan stages may be counter-rotating.

In Example 13, the subject matter of any one of Examples 10 to 12 may optionally include that the thrust fan unit may include at least one fan stage being coupled to and driven by a further fan stage via a reduction planetary gearbox.

In Example 14, the subject matter of any one of Examples 6 to 13 may optionally include that the thrust fan unit may include a thrust vectoring mechanism.

In Example 15, the subject matter of Example 14 may optionally include that the thrust vectoring mechanism may include a plurality of hollow vanes arranged radially from a fixed hub at an outlet of the thrust fan unit, wherein each of the plurality of hollow vanes may include:

an opening at a tip of respective hollow vane; and at least one slot extending longitudinally along a vane face on one side of the respective hollow vane, wherein the opening and the at least one slot provide access into an inner cavity of the respective hollow vane.

In Example 16, the subject matter of Example 15 may optionally include that each of the plurality of hollow vanes may include a plurality of elongated control surface slats extending longitudinally along the vane face of the respective hollow vane to form the at least one slot, wherein the plurality of elongated control surface slats are in a louver arrangement.

In Example 17, the subject matter of Example 16 may optionally include that each of the plurality of elongated control surface slats may have a twist profile so as to better accommodate the air flow.

In Example 18, the subject matter of Example 16 or 17 may optionally include that each of the plurality of elongated control surface slats may be rotatable about respective longitudinal axis.

In Example 19, the subject matter of any one of Examples 15 to 18 may optionally include that each of the plurality of hollow vanes may be rotatable about respective longitudinal axis.

In Example 20, the subject matter of any one of Examples 2 to 19 may optionally include that the powertrain may include:
  a horizontal air propulsion unit; and
  an electric motor coupled to the horizontal air propulsion unit to drive the horizontal air propulsion unit,
    wherein the electric motor is electrically coupled to the generator.

In Example 21, the subject matter of Example 20 may optionally include that the powertrain may include an auxiliary clutch mechanism coupled to the electric motor in a manner such that a driving member of the auxiliary clutch mechanism may be rotatable by the electric motor, wherein the horizontal air propulsion unit is coupled to a first driven member of the auxiliary clutch mechanism,
  wherein the auxiliary clutch mechanism is operable to engage or disengage the first driven member of the auxiliary clutch mechanism and the driving member of the auxiliary clutch mechanism so as to connect or disconnect the horizontal air propulsion unit and the electric motor, and wherein the main drive shaft assembly is coupled to a second driven member of the auxiliary clutch mechanism,
  wherein the auxiliary clutch mechanism is operable to engage or disengage the second driven member of the auxiliary clutch mechanism and the driving member of the auxiliary clutch mechanism so as to connect or disconnect the main drive shaft assembly and the electric motor.

Example 22 is a land and aerial transportation vehicle, including:
  a powertrain according to any one of Examples 1-21;
  a plurality of wheels, wherein at least one of the wheels being the drive wheel which is provided for driving the vehicle on land; and
  at least the one air propulsion unit for providing lift and/or forward propulsion for aerial travel of the vehicle.

Example 23 is an axle assembly for a vehicle capable of land and aerial transportation, the axle assembly including:
  an axle shaft;
  a clutch mechanism coupled to an end of the axle shaft in a manner such that a driving member of the clutch mechanism is rotatable by the axle shaft;
  a drive wheel coupled to a first driven member of the clutch mechanism, wherein the clutch mechanism is operable to engage or disengage the first driven member of the clutch mechanism and the driving member of the clutch mechanism so as to connect or disconnect the drive wheel and the axle shaft; and
  an air propulsion unit coupled to a second driven member of the clutch mechanism, wherein the clutch mechanism is operable to engage or disengage the second driven member of the clutch mechanism and the driving member of the clutch mechanism so as to connect or disconnect the air propulsion unit and the axle shaft.

In Example 24, the subject matter of Example 23 may optionally include that a connection arrangement between the air propulsion unit and the clutch mechanism may include:
  a transfer shaft with a first end coupled to the second driven member of the clutch mechanism;
  a planetary gear set with a sun gear coupled to a second end of the transfer shaft; and
  an electric hub motor mounted to the transfer shaft, the electric hub motor operable to rotate a hub motor body relative to the transfer shaft and about a longitudinal axis of the transfer shaft,
  wherein a ring gear of the planetary gear set is coupled to the hub motor body,
  wherein a planet carrier connecting respective centres of planet gears of the planetary gear set is coupled to the air propulsion unit.

In Example 25, the subject matter of Example 23 or 24 may optionally include that the air propulsion unit may include a thrust fan unit oriented with a fan-blade-rotational-axis perpendicular to a rotational axis of the drive wheel in a manner so as to be capable of generating a thrust providing vertical lift.

In Example 26, the subject matter of Example 25 may optionally include that the connection arrangement may further include a converter mechanism, the converter mechanism being connected between the planet carrier of the planetary gear set and the thrust fan unit, wherein the converter mechanism converts a rotation about a rotational axis of the planet carrier of the planetary gear set to a rotation about the fan-blade-rotational-axis of the thrust fan unit.

Example 27 is a thrust fan unit, including
  multiple fan stages arranged in series; and
  a thrust vectoring mechanism,
  wherein the thrust vectoring mechanism includes a plurality of hollow vanes arranged radially from a fixed hub at an outlet of the thrust fan unit, wherein each of the plurality of hollow vanes includes
    an opening at a tip of respective hollow vane; and
    at least one slot extending longitudinally along a vane face on one side of the respective hollow vane,
    wherein the opening and the at least one slot provide access into an inner cavity of the respective hollow vane In Example 28, the subject matter of Example 27 may optionally include that each of the plurality of hollow vanes may include a plurality of elongated control surface slats extending longitudinally along the vane face of the respective hollow vane to form the at least one slot, wherein the plurality of elongated control surface slats are in a louver arrangement. According to various embodiments, each of the plurality of elongated control surface slats may have a twist profile so as to better accommodate the air flow.

In Example 29, the subject matter of Example 28 may optionally include that each of the plurality of elongated control surface slats may have a twist profile so as to better accommodate the air flow.

In Example 30, the subject matter of Example 28 or 29 may optionally include that each of the plurality of elongated control surface slats may be rotatable about respective longitudinal axis.

In Example 31, the subject matter of any one of Examples 27 to 30 may optionally include that each of the plurality of hollow vanes may be rotatable about respective longitudinal axis.

FIG. 1A shows a schematic diagram of a powertrain 100 for a vehicle 101 capable of land and aerial transportation according to various embodiments. According to various embodiments, the land and aerial transportation vehicle 101 may include the powertrain 100. According to various embodiments, the powertrain 100 may include an engine 110 or at least one engine 110 or one or more engine 110. According to various embodiments, the engine 110 may include an automotive engine such as heat engine. According to various embodiments, the heat engine may include, but not limited to, an internal combustion engine, or an external combustion engine, or a steam engine, or a gasoline engine, or a carburetor engine, or a diesel engine, or a turbine engine (which is able to provide lateral thrust and mechanical torque simultaneously), etc. According to various embodiments, the engine 110 may include at least one output shaft 112 (or one or more output shaft 112). According to various embodiments, the engine 110 may generate a rotary motion in the at least one output shaft 112. According to various embodiments, the at least one output shaft 112 may be in a traverse arrangement or a coaxial arrangement.

Figure 1B:
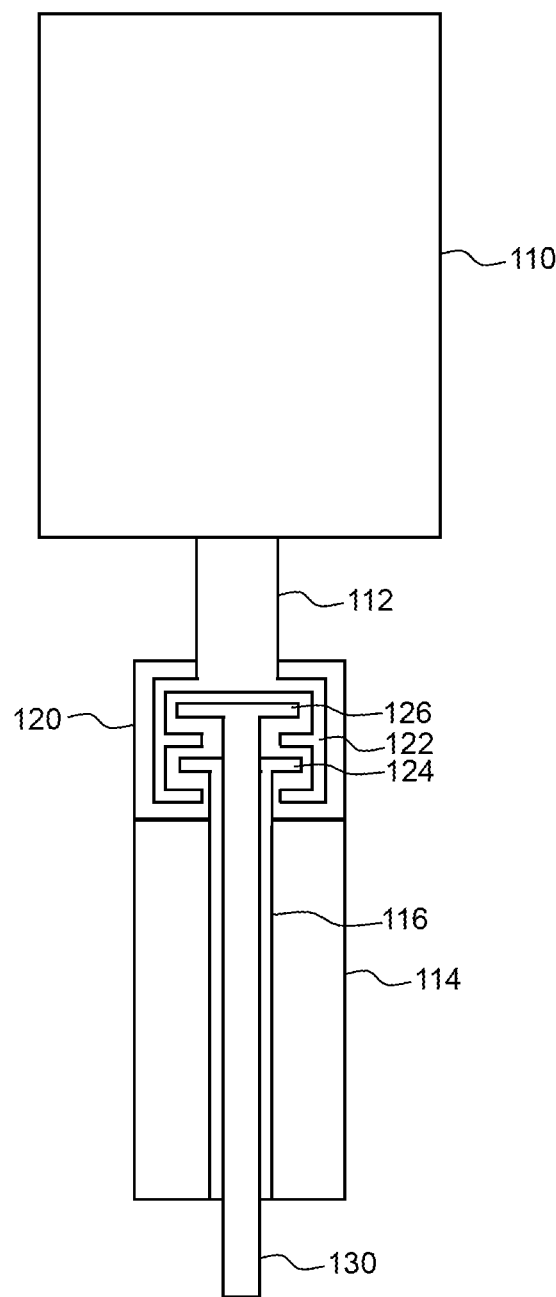
FIG. 1B shows a schematic diagram of a primary clutch mechanism of the powertrain of FIG. 1A according to various embodiment.

FIG. 1B shows a schematic diagram of a primary clutch mechanism 120 of the powertrain 100 of FIG. 1A according to various embodiments. According to various embodiments, the powertrain 100 may include the primary clutch mechanism 120 coupled to the at least one output shaft 112 of the engine 110 in a manner such that a driving member 122 of the primary clutch mechanism 120 may be rotatable by the at least one output shaft 112 of the engine 110. Accordingly, the primary clutch mechanism 120 may include the driving member 122 which may be fixedly coupled to the at least one output shaft 112 of the engine 110 such that the driving member 122 of the primary clutch mechanism 120 may rotate at the same speed as the at least one output shaft 112 when the at least one output shaft 112 is rotated during operation of the engine 110. According to various embodiments, the at least one output shaft 112 of the engine 110 and the driving member 122 of the primary clutch mechanism 120 may be integrally connected or joined or formed so as to function as a single rotating unit.

According to various embodiments, the powertrain 100 may include a main drive shaft assembly 130 coupled to a driven member 126 of the primary clutch mechanism 120. According to various embodiments, the driven member 126 of the primary clutch mechanism 120 may be fixedly coupled to the main drive shaft assembly 130 such that the driven member 126 and the main drive shaft assembly 130 may rotate together. Accordingly, the driven member 126 of the primary clutch mechanism 120 and the main drive shaft assembly 130 may be integrally connected or joined or formed so as to function as a single rotating unit. According to various embodiments, the main drive shaft assembly 130 may extend longitudinally from a front portion 107 of the vehicle 101 towards a rear portion 109 of the vehicle 101. According to various embodiments, the main drive shaft assembly 130 may transmit torque and rotation along a length of the vehicle. According to various embodiments, the main drive shaft assembly 130 may include a single shaft formed as a single piece. According to various embodiments, the main drive shaft assembly 130 may include multiple sections joined together to form the main drive shaft assembly 130. According to various embodiments, the multiple sections may be joined via universal pivot joints or flexible couplings etc to form the main drive shaft assembly 130. According to various embodiments, the main drive shaft assembly 130 may include multiple sections connected to a transfer case (for example, transfer case assembly 134). For example, the main drive shaft assembly 130 may include a first section connecting a front portion of the powertrain 100 to the transfer case and a second section connecting the transfer case to the rear portion of the powertrain 100.

FIG. 1B is provided for illustration purposes only to explain the primary clutch mechanism 120 and should not be construed to be limiting. It is understood that when the at least one output shaft 112 of the engine 110 is in a traverse arrangement, there may be additional motion conversion arrangement to connect the at least one output shaft 112 of the engine 110 to the driving member 112 of the primary clutch mechanism 120 and/or to connect the driven member 126 of the primary clutch mechanism 120 to the main drive shaft assembly 120 such that the rotation of the at least one output shaft 112 of the engine 110 may be transmitted to the main drive shaft assembly 120 when the at least one output shaft 112 and the main drive shaft assembly 120 are non-parallel or non-coaxial. Further, it is also understood that the configuration and arrangement of the driving member 112 of the primary clutch mechanism 120, the driven member 126 of the primary clutch mechanism 120 and a further driven member 124 of the primary clutch mechanism 120 (to be described later) may be in any suitable manner to serve the respective function and purposes. While in FIG. 1B, it is shown as an example that the driving member 112 of the primary clutch mechanism 120, the driven member 126 of the primary clutch mechanism 120 and the further driven member 124 of the primary clutch mechanism may be configured and arranged such that the main drive shaft assembly 130 and a generator 114 (to be described later) are on a same side of the primary clutch mechanism 120 and the engine 110 is on an opposite side of the primary clutch mechanism 120, it is understood that the primary clutch mechanism 120 may be configured such that the driving member 112 of the primary clutch mechanism 120, the driven member 126 of the primary clutch mechanism 120 and the further driven member 124 of the primary clutch mechanism may be configured and arranged such that the engine 110 and the generator 114 may be on a same side of the primary clutch mechanism 120 and the main drive shaft assembly 130 may be on an opposite side of the primary clutch mechanism 120.

According to various embodiments, the primary clutch mechanism 120 may be operable to engage or disengage the driven member 126 of the primary clutch mechanism 120 and the driving member 122 of the primary clutch mechanism 120 so as to connect or disconnect the main drive shaft assembly 130 and the at least one output shaft 112 of the engine 110. Accordingly, when the driven member 126 of the primary clutch mechanism 120 is engaged with the driving member 122 of the primary clutch mechanism 120, they may be locked together and spin at the same speed. Hence, the main drive shaft assembly 130 and the at least one output shaft 112 of the engine 110 may be connected together by the primary clutch mechanism 120 so as to rotate as a single unit, whereby the rotation of the at least one output shaft 112 of the engine 110 is transmitted to the main drive shaft assembly 130. When the driven member 126 of the primary clutch mechanism 120 is disengaged from the driving member 122 of the primary clutch mechanism 120, they may be separated from and independent of each other. Hence, the main drive shaft assembly 130 and the at least one output shaft 112 of the engine 110 may be disconnected from each other by the primary clutch mechanism 120 such that the rotation of the at least one output shaft 112 of the engine 110 is no longer transmitted to the main drive shaft assembly 130.

Referring back to FIG. 1A, according to various embodiments, the powertrain 100 may include a first axle shaft 140a coupled transversely to the main drive shaft assembly 130 and driven by the main drive shaft assembly 130. According to various embodiments, the first axle shaft 140a may transmit a rotation and torque from the main drive shaft assembly 130 to a distal end 142a of the first axle shaft 140a. According to various embodiments, the first axle shaft 140a may be perpendicular to the main drive shaft assembly 130 such that, in transmitting the rotation of the main drive shaft assembly 130 to the first axle shaft 140a, a direction of an axis of rotation of the main drive shaft assembly 130 may be changed by approximately 90° to a direction of an axis of rotation of the axle shaft 140a.

Figure 1C:
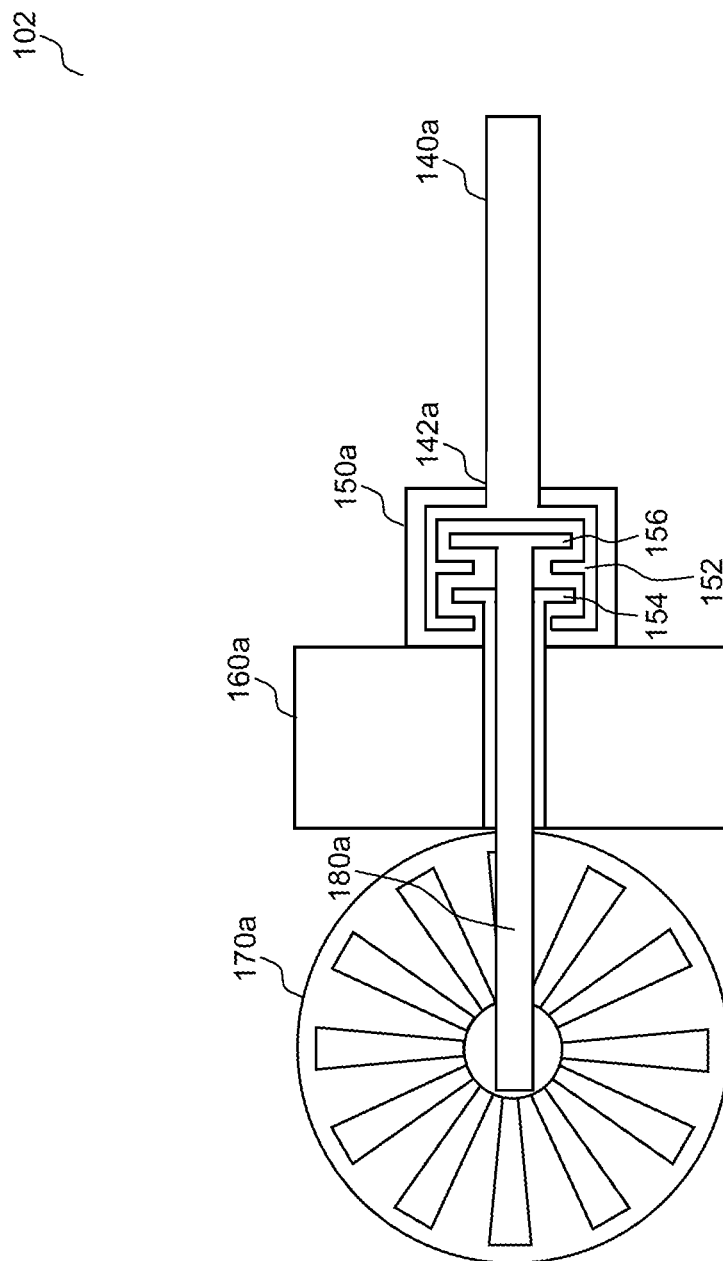
FIG. 1C shows a schematic diagram of an axle assembly of the powertrain of FIG. 1A according to various embodiments.

FIG. 1C shows a schematic diagram of an axle assembly 102 of the powertrain 100 of FIG. 1A according to various embodiments. According to various embodiments, the powertrain 100 or the axle assembly 102 of the powertrain 100 may include a first secondary clutch mechanism 150a coupled to the distal end 142a of the first axle shaft 140a in a manner such that a driving member 152 of the first secondary clutch mechanism 150a is rotatable by the first axle shaft 140a. Accordingly, the first secondary clutch mechanism 150a may include the driving member 152 which may be fixedly coupled to the first axle shaft 140a such that the driving member 152 of the first secondary clutch mechanism 150a may rotate at the same speed as the first axle shaft 140a when the first axle shaft 140a is rotated by the main drive shaft assembly 130 during operation of the engine 110. According to various embodiments, the first axle shaft 140a and the driving member 152 of the first secondary clutch mechanism 150a may be integrally connected or joined or formed so as to function as a single rotating unit.

According to various embodiments, the powertrain 100 or the axle assembly 102 of the powertrain 100 may include a first drive wheel 160a coupled to a first driven member 154 of the first secondary clutch mechanism 150a. According to various embodiments, the first driven member 154 of the first secondary clutch mechanism 150a may be fixedly coupled to the first drive wheel 160a such that the first driven member 154 and the first drive wheel 160a may rotate together. Accordingly, the first driven member 154 of the first secondary clutch mechanism 150a and the first drive wheel 160a may be integrally connected or joined or formed so as to function as a single rotating unit. According to various embodiments, the first drive wheel 160a may be disposed at a first lateral side 103 of the vehicle 101. According to various embodiments, the first driven member 154 of the first secondary clutch mechanism 150a may transmit torque and rotation to the first drive wheel 160a.

According to various embodiments, the first secondary clutch mechanism 150a may be operable to engage or disengage the first driven member 154 of the first secondary clutch mechanism 150a and the driving member 152 of the first secondary clutch mechanism 150a so as to connect or disconnect the first drive wheel 160a and the first axle shaft 140a. Accordingly, when the first driven member 154 of the first secondary clutch mechanism 150a is engaged with the driving member 152 of the first secondary clutch mechanism 150a, they may be locked together and spin at the same speed. Hence, the first drive wheel 160a and the first axle shaft 140a may be connected together by the first secondary clutch mechanism 150a so as to rotate as a single unit, whereby the rotation of the first axle shaft 140a, due to the rotation of the main drive shaft assembly 130 from the operation of the engine 110, is transmitted to the first drive wheel 160a. When the first driven member 154 of the first secondary clutch mechanism 150a is disengaged from the driving member 152 of the first secondary clutch mechanism 150a, they may be separated from and independent of each other. Hence, the first drive wheel 160a and the first axle shaft 140a may be disconnected from each other by the first secondary clutch mechanism 150a such that the rotation of the first axle shaft 140a is no longer transmitted to the first drive wheel 160a.

According to various embodiments, the powertrain 100 or the axle assembly 102 of the powertrain 100 may include a first air propulsion unit 170a coupled to a second driven member 156 of the first secondary clutch mechanism 150a. According to various embodiments, the second driven member 156 of the first secondary clutch mechanism 150a may be coupled to the first air propulsion unit 170a in a manner such that the second driven member 156 may rotate and drive the first air propulsion unit 170a. Accordingly, the second driven member 156 of the first secondary clutch mechanism 150a and the first air propulsion unit 170a may be connected or joined or assembled in a manner such that the second driven member 156 of the first secondary clutch mechanism 150a may rotate so as to serve to drive the first air propulsion unit 170a. According to various embodiments, the first air propulsion unit 170a may be configured to generate thrust for flying. According to various embodiments, the first air propulsion unit 170a may be disposed at the first lateral side 103 of the vehicle 101. According to various embodiments, the first air propulsion unit 170a may be disposed adjacent to the first drive wheel 160a. According to various embodiments, the second driven member 156 of the first secondary clutch mechanism 150a may transmit torque and rotation to drive the first air propulsion unit 170a. According to various embodiments, the powertrain 100 or the axle assembly 102 of the powertrain 100 may include a first connection arrangement 180a between the first air propulsion unit 170a and the first secondary clutch mechanism 150a. According to various embodiments, the first connection arrangement 180a may include any one or a combination of a gear or belt or chain or links or other suitable components to connect the second driven member 156 of the first secondary clutch mechanism 150a to the first air propulsion unit 170a so as to transmit torque and rotation to drive the first air propulsion unit 170a.

According to various embodiments, the first secondary clutch mechanism 150a may be operable to engage or disengage the second driven member 156 of the first secondary clutch mechanism 150a and the driving member 152 of the first secondary clutch mechanism 150a so as to connect or disconnect the first air propulsion unit 170a and the first axle shaft 140a. Accordingly, when the second driven member 156 of the first secondary clutch mechanism 150a is engaged with the driving member 152 of the first secondary clutch mechanism 150a, they may be locked together and spin at the same speed. Hence, the first air propulsion unit 170a and the first axle shaft 140a may be connected together by the first secondary clutch mechanism 150a so as to drive the first air propulsion unit 170a, whereby the rotation of the first axle shaft 140a, due to the rotation of the main drive shaft assembly 130 from the operation of the engine 110, is transmitted to drive the first air propulsion unit 170a. When the second driven member 156 of the first secondary clutch mechanism 150a is disengaged from the driving member 152 of the first secondary clutch mechanism 150a, they may be separated from and independent of each other. Hence, the first air propulsion unit 170a and the first axle shaft 140a may be disconnected from each other by the first secondary clutch mechanism 150a such that the rotation of the first axle shaft 140a is no longer transmitted to the first air propulsion unit 170a.

According to various embodiments, the first secondary clutch mechanism 150a may be configured to engage either the first driven member 154 of the first secondary clutch mechanism 150a or the second driven member 156 of the first secondary clutch mechanism 150a to the driving member 152 of the first secondary clutch mechanism 150a so as to independently connect the first drive wheel 160a and the first air propulsion unit 170a to the first axle shaft 140a. According to various embodiments, the first secondary clutch mechanism 150a may be configured to disengage either the first driven member 154 of the first secondary clutch mechanism 150a or the second driven member 156 of the first secondary clutch mechanism 150a from the driving member 152 of the first secondary clutch mechanism 150a so as to independently disconnect the first drive wheel 160a and the first air propulsion unit 170a from the first axle shaft 140a.

FIG. 1C is provided for illustration purposes only to explain the secondary clutch mechanism 120 and should not be construed to be limiting. It is understood that the configuration and arrangement of the driving member 152 of the first secondary clutch mechanism 150a, the first driven member 154 of the first secondary clutch mechanism 150a and the second driven member 156 of the first secondary clutch mechanism 150a may be in any suitable manner to serve the respective function and purposes. While in FIG. 1C, it is shown as an example that the driving member 152 of the first secondary clutch mechanism 150a, the first driven member 154 of the first secondary clutch mechanism 150a and the second driven member 156 of the first secondary clutch mechanism 150a may be configured and arranged such that the first drive wheel 160a and the first air propulsion unit 170a are connected to a same side of the first secondary clutch mechanism 150a and the first axle shaft 140a is connected to an opposite side of the first secondary clutch mechanism 150a, it is understood that the first secondary clutch mechanism 150a may be configured such that the driving member 152 of the first secondary clutch mechanism 150a, the first driven member 154 of the first secondary clutch mechanism 150a and the second driven member 156 of the first secondary clutch mechanism 150a may be configured and arranged such that the first air population unit 170a and the first axle shaft 140a may be connected to a same side of the first secondary clutch mechanism 150a and the first drive wheel 160a may be connected to an opposite side of the first secondary clutch mechanism 150a.

Referring back to FIG. 1A, according to various embodiments, the powertrain 100 may include a differential assembly 132 which couples the first axle shaft 140a to the main drive shaft assembly 130. According to various embodiments, the first axle shaft 140a may be a half axle connected to the differential assembly 132. Accordingly, the first axle shaft 140a may extend from the differential assembly 132 to the first lateral side 103 of the vehicle 101.

According to various embodiments, the powertrain 100 may include a second axle shaft 140b coupled to the differential assembly 132. Accordingly, the second axle shaft 140b may extend from the differential assembly 132 to a second lateral side 105 of the vehicle 101. According to various embodiments, the powertrain 100 may include a second secondary clutch mechanism 150b coupled to a distal end 142b of the second axle shaft 140b, a second drive wheel 160b coupled to the second secondary clutch mechanism 150b, a second air propulsion unit 170b coupled to the second secondary clutch mechanism 150b, and a second connection arrangement 180b between the second air propulsion unit 170b and the second secondary clutch mechanism 150b. According to various embodiments, the second axle shaft 140b, the second secondary clutch mechanism 150b, the second drive wheel 160b, the second air propulsion unit 170b and the second connection arrangement 180b may be coupled together in a manner similar to that of the first axle shaft 140a, the first secondary clutch mechanism 150a, the first drive wheel 160a, the first air propulsion unit 170a and the first connection arrangement 180a as previously described.

According to various embodiments, the powertrain 100 may include a transfer case assembly 134 and a secondary drive shaft assembly 136. The transfer case assembly 134 may couple the main drive shaft assembly 130 to the secondary drive shaft assembly 136. According to various embodiments, the transfer case assembly 134 may be configured to transmit the rotation and torque from the main drive shaft assembly 130 to the secondary drive shaft assembly 136. According to various embodiments, the powertrain 100 may include an auxiliary differential assembly 138 which couples a third axle shaft 140c to the secondary drive shaft assembly 136. According to various embodiments, the third axle shaft 140c may be a half axle connected to the auxiliary differential assembly 138. Accordingly, the third axle shaft 140c may extend from the auxiliary differential assembly 138 to the first lateral side 103 of the vehicle 101. According to various embodiments, the powertrain 100 may include a third secondary clutch mechanism 150c coupled to a distal end 142c of the third axle shaft 140c, a third drive wheel 160c coupled to the third secondary clutch mechanism 150c, a third air propulsion unit 170c coupled to the third secondary clutch mechanism 150c, and a third connection arrangement 180c between the third air propulsion unit 170c and the third secondary clutch mechanism 150c. According to various embodiments, the third axle shaft 140c, the third secondary clutch mechanism 150c, the third drive wheel 160c, the third air propulsion unit 170c, and the third connection arrangement 180c may be coupled together in a manner similar to that of the first axle shaft 140a, the first secondary clutch mechanism 150a, the first drive wheel 160a, the first air propulsion unit 170a, and the first connection arrangement 180a as previously described.

According to various embodiments, the powertrain 100 may include a fourth axle shaft 140d which may be coupled to the auxiliary differential assembly 138. Accordingly, the fourth axle shaft 140d may extend from the auxiliary differential assembly 138 to the second lateral side 105 of the vehicle 101. According to various embodiments, the powertrain 100 may include a fourth secondary clutch mechanism 150d coupled to a distal end 142d of the fourth axle shaft 140d, a fourth drive wheel 160d coupled to the fourth secondary clutch mechanism 150d, a fourth air propulsion unit 170d coupled to the fourth secondary clutch mechanism 150d, and a fourth connection arrangement 180d between the fourth air propulsion unit 170d and the fourth secondary clutch mechanism 150d. According to various embodiments, the fourth axle shaft 140d, the fourth secondary clutch mechanism 150d, the fourth drive wheel 160d, the fourth air propulsion unit 170d and the fourth connection arrangement 180d may be coupled together in a manner similar to that of the first axle shaft 140a, the first secondary clutch mechanism 150a, the first drive wheel 160a, the first air propulsion unit 170a and the first connection arrangement 180a as previously described.

According to various embodiments, the powertrain 100 may include the generator 114 or at least one generator 114 or one or more generator 114 coupled to the engine 110 in a manner so as to be powered by the engine 110. According to various embodiments, the generator 114 may be configured for electricity generation whereby motive power (or mechanical energy) from the engine 110 may be converted into electrical power for use in electrical circuits. According to various embodiments, the generator 114 may include direct current generator or alternating current generator.

Referring to FIG. 1B, according to various embodiments, the primary clutch mechanism 120 may include the further driven member 124. According to various embodiments, a rotor 116 of the generator 114 may be coupled to the further driven member 124 of the primary clutch mechanism 120. According to various embodiments, the further driven member 124 of the primary clutch mechanism 120 may be fixedly coupled to the rotor 116 of the generator 114 such that the further driven member 124 and rotor 116 may rotate together. Accordingly, the further driven member 124 of the primary clutch mechanism 120 and the rotor 116 of the generator 114 may be integrally connected or joined or formed so as to function as a single rotating unit. According to various embodiments, the further driven member 124 of the primary clutch mechanism 120 may transmit torque and rotation to the rotor 116 of the generator 114 for rotating the rotor 116 to generate electricity. According to various embodiments, the generator 114 may be disposed with the rotor 116 aligned to be coaxial with the main drive shaft assembly 130. According to various embodiments, the further driven member 124 of the primary clutch mechanism 120 which is coupled to the rotor 116 of the generator 114 and the driven member 126 of the primary clutch mechanism 120 which is coupled to the main drive shaft assembly 130 may be mechanically coupled on the same side (or end portion) of the main drive shaft assembly 130. According to various embodiments, the rotor 116 may be a hollow cylinder with a central channel extending longitudinally whereby the rotor 116 surrounds a section of the main drive shaft assembly 130 and the main drive shaft assembly 130 runs through the central channel of the rotor 116. For example, see rotor 216 of the generator 214 of FIG. 2A.

According to various embodiments, the primary clutch mechanism 120 may be operable to engage or disengage the further driven member 124 of the primary clutch mechanism 120 and the driving member 122 of the primary clutch mechanism 120 so as to connect or disconnect the rotor 116 of the generator 114 and the at least one output shaft 112 of the engine 110. Accordingly, when the further driven member 124 of the primary clutch mechanism 120 is engaged with the driving member 122 of the primary clutch mechanism 120, they may be locked together and spin at the same speed. Hence, the rotor 116 of the generator 114 and the at least one output shaft 112 of the engine 110 may be connected together by the primary clutch mechanism 120 so as to rotate as a single unit, whereby the rotation of the at least one output shaft 112 of the engine 110 is transmitted to the rotor 116 of the generator 114 for generating electricity. When the further driven member 124 of the primary clutch mechanism 120 is disengaged from the driving member 122 of the primary clutch mechanism 120, they may be separated from and independent of each other. Hence, the rotor 116 of the generator 114 and the at least one output shaft 112 of the engine 110 may be disconnected from each other by the primary clutch mechanism 120 such that the rotation of the at least one output shaft 112 of the engine 110 is no longer transmitted to the rotor 116 of the generator 114.

According to various embodiments, the primary clutch mechanism 120 may be configured to simultaneously engage the driven member 126 and the further driven member 124 to the driving member 122 so as to simultaneously connect the main drive shaft assembly 130 and the rotor 116 of the generator 114 to the at least one output shaft 112 of the engine 110. According to various embodiments, the primary clutch mechanism 120 may be configured to simultaneously disengage the driven member 126 and the further driven member 124 to the driving member 122 so as to simultaneously disconnect the main drive shaft assembly 130 and the rotor 116 of the generator 114 from the at least one output shaft 112 of the engine 110. According to various embodiments, the primary clutch mechanism 120 may be configured to engage either the driven member 126 or the further driven member 124 to the driving member 122 so as to independently connect the main drive shaft assembly 130 or the rotor 116 of the generator 114 to the at least one output shaft 112 of the engine 110. According to various embodiments, the primary clutch mechanism 120 may be configured to disengage either the driven member 126 or the further driven member 124 from the driving member 122 so as to independently disconnect the main drive shaft assembly 130 or the rotor 116 of the generator 114 from the at least one output shaft 112 of the engine 110.

According to various embodiments, the first air propulsion unit 170a may be electrically powered by the generator 114 as schematically represented by line 118a as shown in FIG. 1A. According to various embodiments, the powertrain 100 may include a first electric motor (see, for example, a first electric hub motor 262a in FIG. 2A) connected between the generator 114 and the first air propulsion unit 170a to power the first air propulsion unit 170a. According to various embodiments, the first electric motor may be configured to convert the electrical energy from the generator 114 into mechanical energy in the form of a rotation of a motor shaft of the first electric motor. According to various embodiments, the first electric motor may include an inbuilt motor of the first air propulsion unit 170a or an external motor, such as the first electric hub motor 262a, coupled to the first air propulsion unit 170a. According to various embodiments, the first electric motor may be electrically coupled to a battery connected to the generator 114. Similarly, each of the second air propulsion unit 170b, the third air propulsion unit 170c, and the fourth air propulsion unit 170d may be electrically powered by the generator 114 as schematically represented by respective line 118b, 118c, 118d as shown in FIG. 1A. According to various embodiments, the powertrain 100 may include a second electric motor (see, for example, a second electric hub motor 262b in FIG. 2A) connected between the generator 114 and the second air propulsion unit 170b, a third electric motor (see, for example, a third electric hub motor 262c in FIG. 2A) connected between the generator 114 and the third air propulsion unit 170c, and a fourth electric motor (see, for example, a fourth electric hub motor 262d in FIG. 2A) connected between the generator 114 and the fourth air propulsion unit 170d. According to various embodiments, each of the second electric motor, the third electric motor and the fourth electric motor may be electrically coupled to the battery in electrical connection with the generator 114. According to various embodiments, the generator 114 may charge the battery for powering the respective electric motor.

Figure 2A:
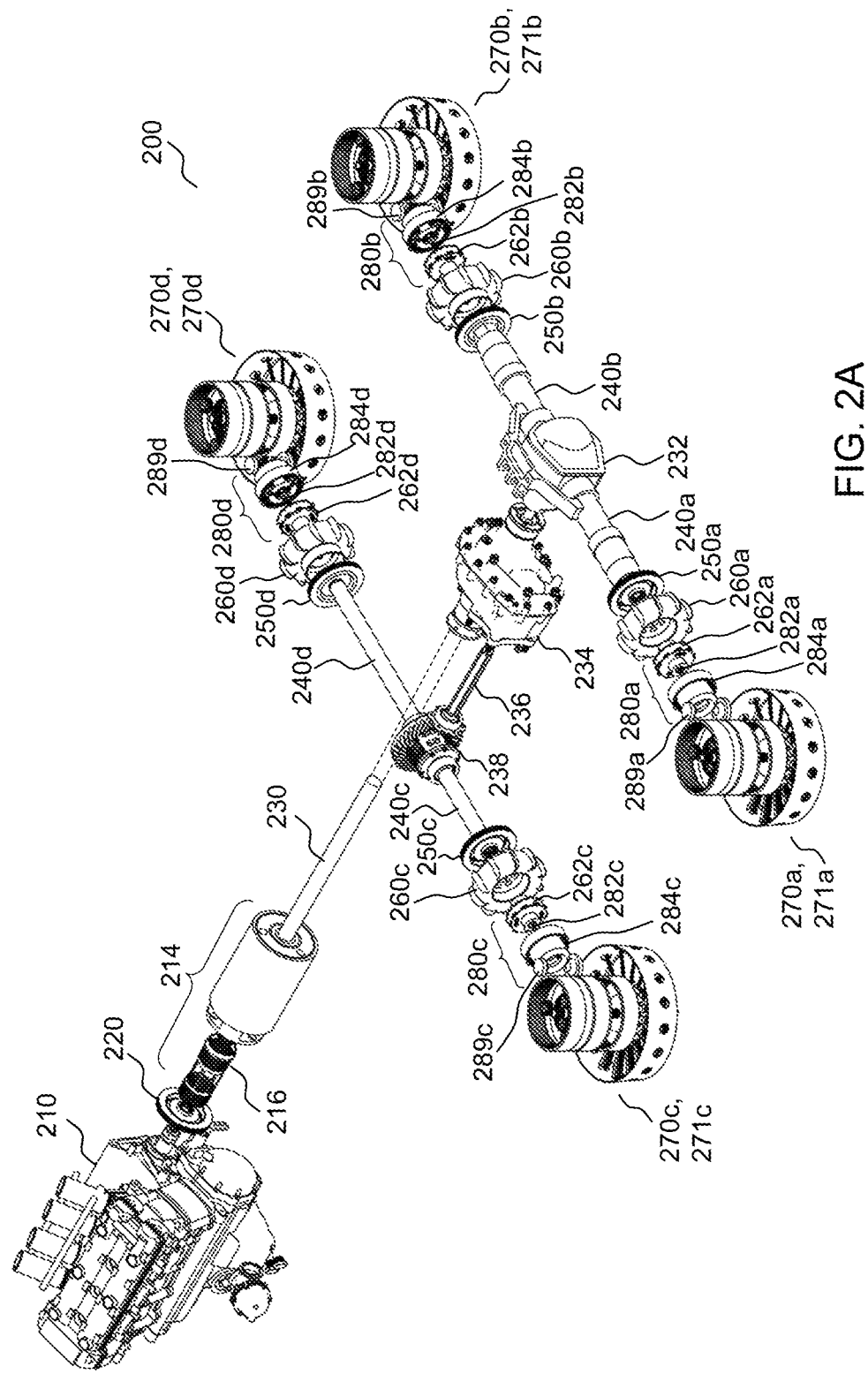
FIG. 2A shows an exploded view of a powertrain for a vehicle capable of land and aerial transportation according to various embodiments.
Figure 2B:
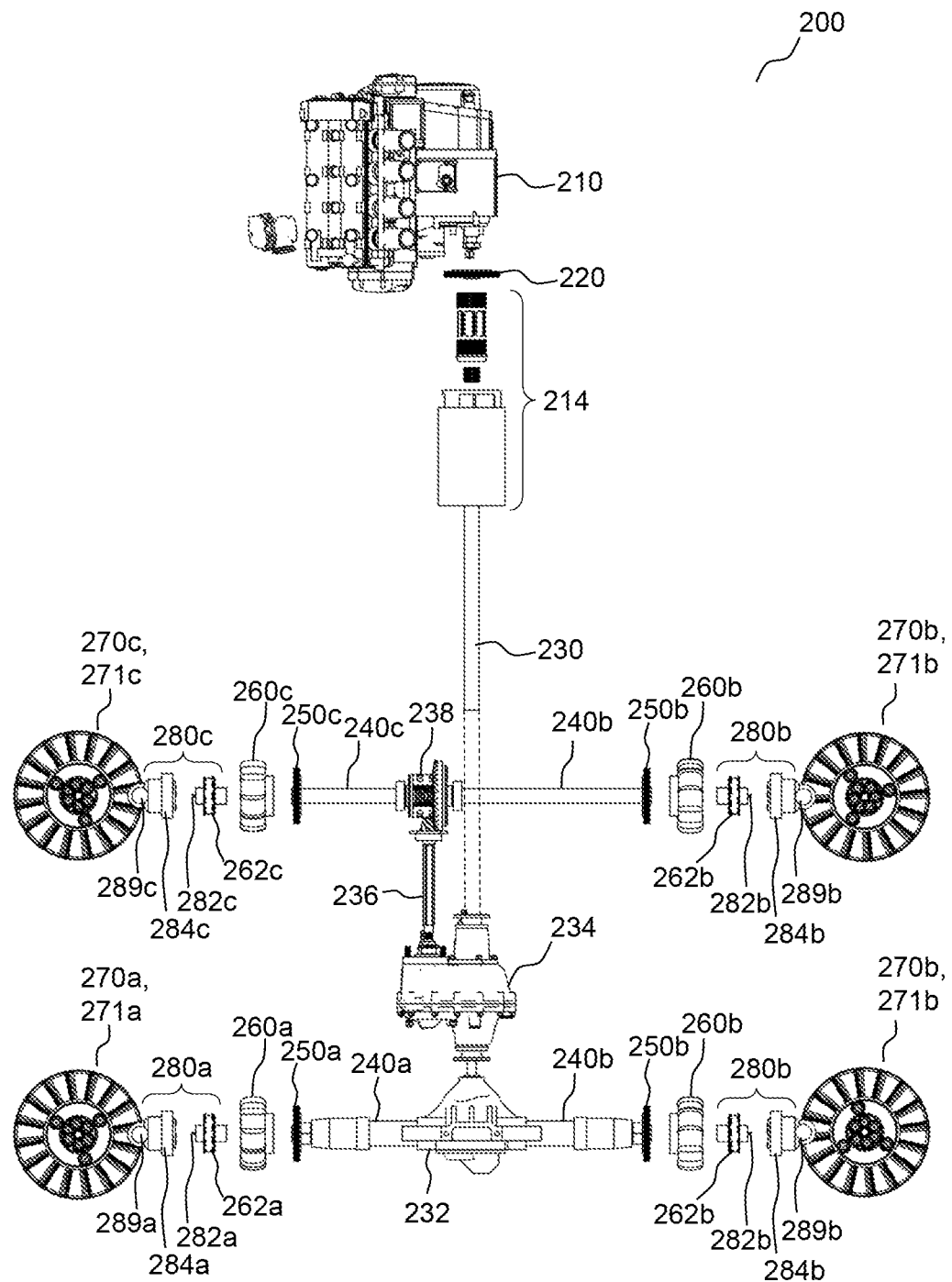
FIG. 2B shows a top view of the powertrain of FIG. 2A according to various embodiments.
Figure 2C:
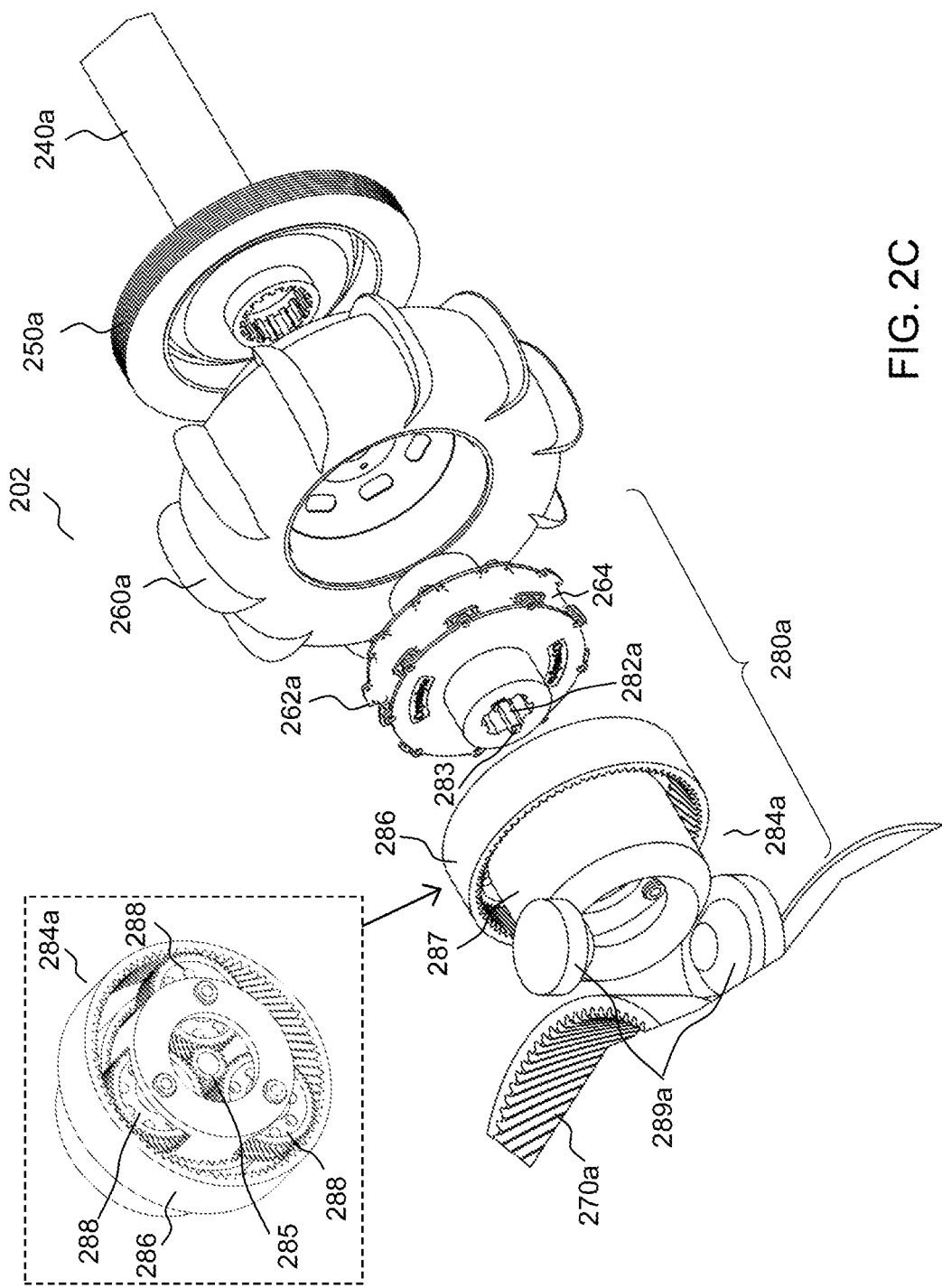
FIG. 2C shows an exploded view of an axle assembly of the powertrain of FIG. 2A according to various embodiments.

FIG. 2A shows an exploded view of a powertrain 200 for a vehicle capable of land and aerial transportation according to various embodiments. FIG. 2B shows a top view of of the powertrain 200 of FIG. 2A (in an exploded manner) according to various embodiments. FIG. 2C shows an exploded view of an axle assembly 202 of the powertrain 200 according to various embodiments. According to various embodiments, the land and aerial transportation vehicle may include the powertrain 200. According to various embodiments, the powertrain 200 may, similar to the power train 100 of FIG. 1A, include an engine 210, a primary clutch mechanism 220, and a main drive shaft assembly 230, which may be coupled together in a manner similar to that of the engine 110, the primary clutch mechanism 120 and the main drive shaft assembly 130 of the powertrain 100 of FIG. 1A as previously described. According to various embodiments, the powertrain 200 or the axle assembly 202 of the powertrain 200 may, similar to the powertrain 100 of FIG. 1A or the axle assembly 102 of the powertrain 100 of FIG. 1C, include a first axle shaft 240a, a first secondary clutch mechanism 250a, a first drive wheel 260a, a first air propulsion unit 270a and a first connection arrangement 280a, which may be coupled together in a manner similar to that of the first axle shaft 140a, the first secondary clutch mechanism 150a, the first drive wheel 160a, the first air propulsion unit 170a and the first connection arrangement 180a of the powertrain 100 of FIG. 1A or the axle assembly 102 of FIG. 1C.

According to various embodiments, the first axle shaft 240a of the powertrain 200 of FIG. 2A may be coupled to the main drive shaft assembly 230 of the powertrain 200 of FIG. 2A in a manner similar to that of the first axle shaft 140a and the main drive shaft assembly 130 of the powertrain 100 of FIG. 1A. According to various embodiments, the powertrain 200 may, similar to the powertrain 100 of FIG. 1A, include a differential assembly 232 which couples the first axle shaft 240a to the main drive shaft assembly 230.

According to various embodiments, the powertrain 200 may, similar to the powertrain 100 of FIG. 1A, include a second axle shaft 240b coupled to the differential assembly 232. According to various embodiments, the powertrain 200 may, similar to the powertrain 100 of FIG. 1A, include a second secondary clutch mechanism 250b, a second drive wheel 260b, a second air propulsion unit 270b, and a second connection arrangement 280b coupled in a manner similar to that of the power train 100 of FIG. 1A.

According to various embodiments, the powertrain 200 may, similar to the powertrain 100 of FIG. 1A, include a transfer case assembly 234, which may couple a secondary drive shaft assembly 236 to the main drive shaft assembly 230. According to various embodiments, the powertrain 200 may, similar to the powertrain 100 of FIG. 1A, include an auxiliary differential assembly 238 which couples a third axle shaft 240c to the secondary drive shaft assembly 236. According to various embodiments, the powertrain 200 may, similar to the powertrain 100 of FIG. 1A, include a third secondary clutch mechanism 250c, a third drive wheel 260c, a third air propulsion unit 270c, and a third connection arrangement 280c coupled in a manner similar to that of the power train 100 of FIG. 1A.

According to various embodiments, the powertrain 200 may, similar to the powertrain 100 of FIG. 1A, include a fourth axle shaft 240d which may be coupled to the auxiliary differential assembly 238. According to various embodiments, the powertrain 200 may, similar to the powertrain 100 of FIG. 1A, include a fourth secondary clutch mechanism 250d, a fourth drive wheel 260d, a fourth air propulsion unit 270d, and a fourth connection arrangement 280d coupled in a manner similar to that of the power train 100 of FIG. 1A.

Referring to FIG. 2C, according to various embodiments, in the powertrain 200 or the axle assembly 202 of the powertrain 200, the first connection arrangement 280a between the first air propulsion unit 270a and the first secondary clutch mechanism 250a may include a first transfer shaft 282a with a first end 281 coupled to the second driven member (see, for example, the second driven member 156 of FIG. 1C) of the first secondary clutch mechanism 250a. According to various embodiments, the second driven member of the first secondary clutch mechanism 250a may be fixedly coupled to the first transfer shaft 282a such that the second driven member and the first transfer shaft 282a may rotate together. Accordingly, the second driven member of the first secondary clutch mechanism 250a and the first transfer shaft 282a may be integrally connected or joined or formed so as to function as a single rotating unit. According to various embodiments, the first transfer shaft 282a may be inserted or may extend through the first drive wheel 260a. According to various embodiments, the first transfer shaft 282a and the first drive wheel 260a may rotate independently of each other. According to various embodiments, when the second driven member of the first secondary clutch mechanism 250a is engaged to the driving member of the first secondary clutch mechanism 250a, the torque and rotation of the first axle shaft 240a may be transmitted to the first transfer shaft 282a.

According to various embodiments, the first connection arrangement 280a may further include a first planetary gear set 284a with a sun gear 285 coupled to a second end 283 of the first transfer shaft 282a. According to various embodiments, the sun gear 285 of the first planetary gear set 284a may be fixedly coupled to the first transfer shaft 282a such that the sun gear 285 of the first planetary gear set 284a and the first transfer shaft 282a may rotate together. Accordingly, the sun gear 285 of the first planetary gear set 284a and the first transfer shaft 282a may be integrally connected or joined or formed so as to function as a single rotating unit.

According to various embodiments, the first connection arrangement 280a may further include the first electric hub motor 262a mounted to the first transfer shaft 282a. According to various embodiments, the first electric hub motor 262a may be operable to rotate a hub motor body 264 relative to the first transfer shaft 282a and about a longitudinal axis of the first transfer shaft 282a. Accordingly, when the first transfer shaft 282a is fixed and the first electric hub motor 262a is operated, the hub motor body 264 may be rotated about the first transfer shaft 282a.

According to various embodiments, a ring gear 286 of the first planetary gear set 284a may be coupled to the hub motor body 264. According to various embodiments, the ring gear 286 of the first planetary gear set 284a may be fixedly coupled to the hub motor body 264 such that the ring gear 286 of the first planetary gear set 284a and the hub motor body 264 may rotate together. Accordingly, the ring gear 286 of the first planetary gear set 284a and the hub motor body 264 may be integrally connected or joined so as to function as a single rotating unit.

According to various embodiments, when the first transfer shaft 282a is fixed and the electric hub motor 262a is operated, the hub motor body 264 may be rotated about the first transfer shaft 282a (or the longitudinal axis of the first transfer shaft 282a) so as to rotate the ring gear 286 of the first planetary gear set 284a relative to the sun gear 285 of the first planetary gear set 284a. Accordingly, relative rotation between the ring gear 286 and the sun gear 285 may cause the planet gears 288 of the planetary gear set 284a to rotate and travel about the sun gear 285. Hence, a planet carrier 287 connecting respective centres of planet gears 288 of the planetary gear set 284a may be rotated about the longitudinal axis of the first transfer shaft 282a (or an axis of rotation of the ring gear 286) as the planet gears 288 of the planetary gear set 284a rotate and travel about the sun gear 285 so as to transmit a torque and rotation of the electric hub motor 262a. According to various embodiments, when the first transfer shaft 282a is rotated (due to the rotation of the first axle shaft 240a) and the operation of the electric hub motor 262a is ceased, the hub motor body 264 may be rotated together in tandem with the first transfer shaft 282a as the first transfer shaft 282a is rotated. Hence, the ring gear 286 of the first planetary gear set 284a may be rotated together in tandem with the sun gear 285 of the first planetary gear set 284a to directly drive the rotation of the planet carrier 287 of the planetary gear set 284a so as to transmit the mechanical torque and rotation of the first axel shaft 240a to the planet carrier 287 of the planetary gear set 284a.

According to various embodiments, the planet carrier 287 of the planetary gear set 284a may be coupled to the first air propulsion unit 270a for driving the first air propulsion unit 270a to generate a thrust. Accordingly, the planet carrier 287 of the planetary gear set 284a and the first air propulsion unit 270a may be connected or joined or assembled in a manner such that the planet carrier 287 of the planetary gear set 284a may be rotate so as to drive the first air propulsion unit 270a. According to various embodiments, the planet carrier 287 of the planetary gear set 284a may transmit torque and rotation to drive the first air propulsion unit 270a.

According to various embodiments, the first electric hub motor 262a may be electrically coupled to the generator 214. Accordingly, when the generator 214 is operated to generate electrical power, the electrical power may be used to operate and drive the electric hub motor 262a for electrically driving the planet carrier 287 of the planetary gear set 284a to drive the first air propulsion unit 270a. According to various embodiments, the first electric hub motor 262a may be electrically coupled to a battery connected to the generator 214. According to various embodiments, the generator 214 may charge the battery for powering the first electric hub motor 262a.

According to various embodiments, the second connection arrangement 280b between the second air propulsion unit 270b and the second secondary clutch mechanism 250b may include a second transfer shaft 282b, a second planetary gear set 284b and a second electric hub motor 262b coupled in a manner similar to that of the first connection arrangement 280a. According to various embodiments, the third connection arrangement 280c between the third air propulsion unit 270c and the third secondary clutch mechanism 250c may include a third transfer shaft 282c, a third planetary gear set 284c and a third electric hub motor 262c coupled in a manner similar to that of the first connection arrangement 280a. According to various embodiments, the fourth connection arrangement 280d between the fourth air propulsion unit 270d and the fourth secondary clutch mechanism 250d may include a fourth transfer shaft 282d, a fourth planetary gear set 284d and a fourth electric hub motor 262d coupled in a manner similar to that of the first connection arrangement 280a.

According to various embodiments, the respective electric hub motor 262b, 262c, 262d may be electrically coupled to the generator 214. Accordingly, when the generator 214 is operated to generate electrical power, the electrical power may be used to operate and drive the respective electric hub motor 262b, 262c, 262d for driving the respective air propulsion unit 270b, 270c, 270d. According to various embodiments, the respective electric hub motor 262b, 262c, 262d may be electrically coupled to the battery connected to the generator 214. According to various embodiments, the generator 214 may charge the battery for powering the respective electric hub motor 262b, 262c, 262d.

According to various embodiments, the first air propulsion unit 270a may include a first thrust fan unit 271a or a propeller oriented with a fan-blade-rotational-axis perpendicular to a rotational axis of the first drive wheel 260a in a manner so as to be capable of generating a thrust providing vertical lift. According to various embodiments, the first thrust fan unit 271a may include, but not limited to, a ducted fan, a turbofan, a fan-jet, or the like. According to various embodiments, the first thrust fan unit 271a may be oriented to direct a thrust towards a ground so as to generate lift. According to various embodiments, the first thrust fan unit 271a may be vertically oriented so as to be capable of generating direct vertical lift thrust. Accordingly, the fan-blade-rotational-axis of the first thrust fan unit 271a may be vertical and may be orthogonal to the horizontal rotational axis of the first drive wheel 260a. According to various embodiments, the first thrust fan unit 271a may be oriented off-vertical so as to be capable of generating indirect vertical lift thrust.

According to various embodiments, a first converter mechanism 289a may be connected between the first thrust fan unit 271a and the second driven member (see, for example, the second driven member 156 of FIG. 1C) of the first secondary clutch mechanism 250a. According to various embodiments, the first converter mechanism 289a may convert a rotation about a rotational axis of the second driven member to a rotation about the fan-blade-rotational-axis of the thrust fan unit 271a. Accordingly, the first converter mechanism 289a may be configured to change a direction of axis of rotation as the torque and rotation is transmitted through the first converter mechanism 289a to drive the thrust fan unit 271a.

According to various embodiments, the first connection arrangement 280a may include the first converter mechanism 289a. According to various embodiments, the first converter mechanism 289a may be connected between the planet carrier 287 of the first planetary gear set 284a and the first thrust fan unit 271a. According to various embodiments, the first converter mechanism 289a may convert a rotation about a rotational axis of the planet carrier 287 of the first planetary gear set 284a to a rotation about the fan-blade-rotational-axis of the thrust fan unit 271a. Accordingly, the first converter mechanism 289a may be configured to change a direction of axis of rotation as the torque and rotation is transmitted from the planet carrier 287 of the first planetary gear set 284a through the first converter mechanism 289a to drive the thrust fan unit 271a. According to various embodiments, the first converter mechanism 289a may include a bevel gear arrangement or a worm gear arrangement or a chain drive arrangement. According to various embodiments, the chain drive arrangement may include a gear which is a carrier of a chain to transmit mechanical torque to the thrust fan unit 271a.

According to various embodiments, the second air propulsion unit 270b may, similar to the first air propulsion unit 270a, include a second thrust fan unit 271b oriented to generate vertical lift thrust. According to various embodiments, a second converter mechanism 289b may, similar to the first converter mechanism 289a, be connected between the second thrust fan unit 271b and the second secondary clutch mechanism 250b. According to various embodiments, the second connection arrangement 280b may, similar to the first connection arrangement 280a, include the second converter mechanism 289b.

According to various embodiments, the third air propulsion unit 270c may, similar to the first air propulsion unit 270a, include a third thrust fan unit 271c oriented to generate vertical lift thrust. According to various embodiments, a third converter mechanism 289c may, similar to the first converter mechanism 289a, be connected between the third thrust fan unit 271c and the third secondary clutch mechanism 250c. According to various embodiments, the third connection arrangement 280c may, similar to the first connection arrangement 280a, include the third converter mechanism 289c.

According to various embodiments, the fourth air propulsion unit 270d may, similar to the first air propulsion unit 270a, include a fourth thrust fan unit 271d oriented to generate vertical lift thrust. According to various embodiments, a fourth converter mechanism 289d may, similar to the first converter mechanism 289a, be connected between the fourth thrust fan unit 271d and the fourth secondary clutch mechanism 250d. According to various embodiments, the fourth connection arrangement 280d may, similar to the first connection arrangement 280a, include the fourth converter mechanism 289d.

Figure 2D:
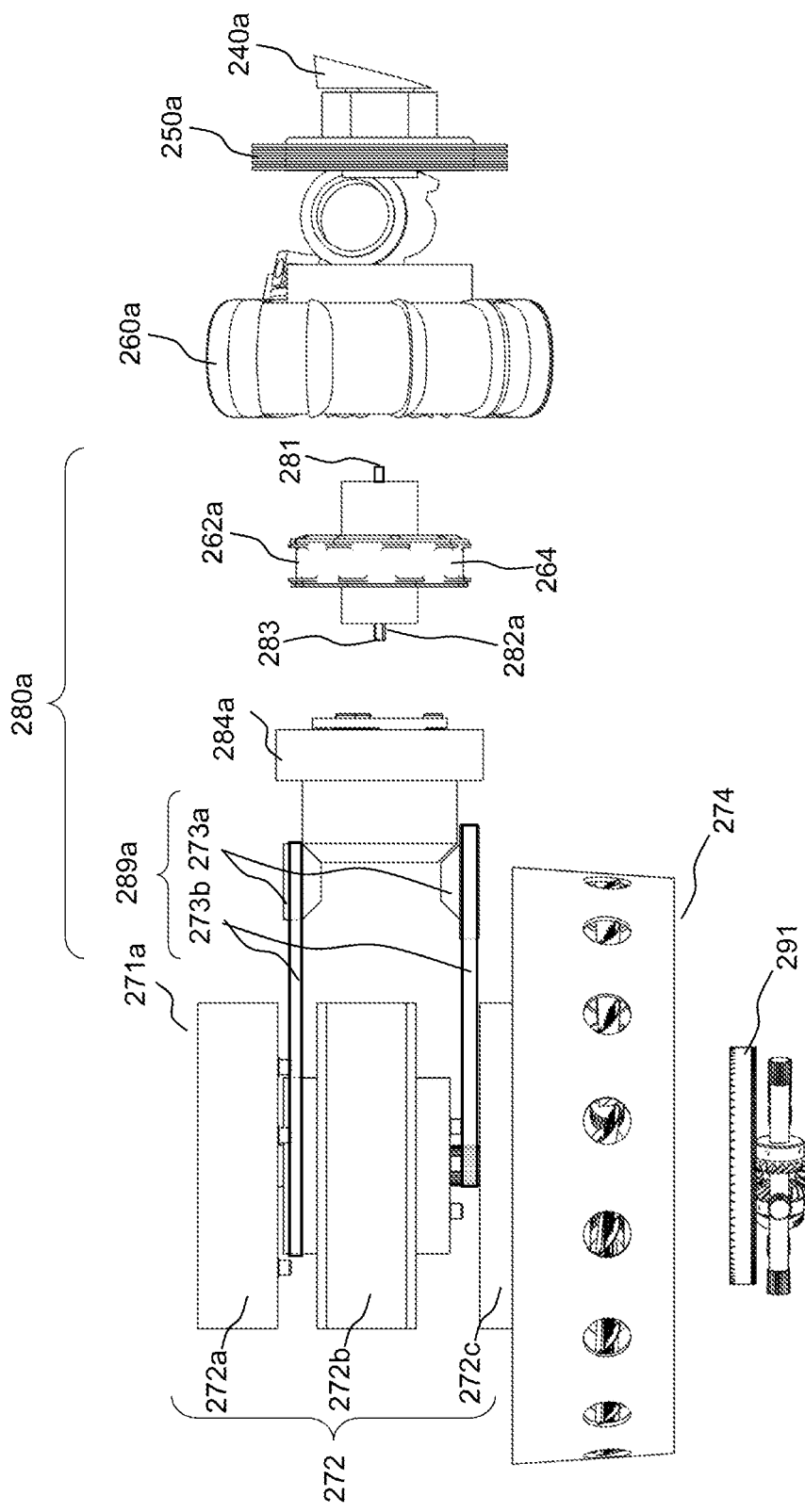
FIG. 2D shows a side view of the axle assembly of FIG. 2C according to various embodiments.

FIG. 2D shows a side view of the axle assembly 202 of the powertrain 200 according to various embodiments. According to various embodiments, the first thrust fan unit 271a may include multiple fan stages 272 arranged in series. Accordingly, multiple fan stages 272 of the thrust fan unit 271a may be stacked or arranged one after another in sequence to create a flow path through the multiple fan stages 272. According to various embodiments, the multiple fan stages 272 of the thrust fan unit 271a may include two or more fan stages. According to various embodiments, the first converter mechanism 289a may include two or more bevel gears 273a for connecting to the multiple fan stages 272 of the thrust fan unit 271a. According to various embodiments, the first converter mechanism 289a may include belt or chain arrangements 273b for connecting the two or more bevel gears 273a to the multiple fan stages 272 of the thrust fan unit 271a. Accordingly, the respective fan stages may be driven by the first converter mechanism 289a. As shown in FIG. 2A and FIG. 2D, according to various embodiments, the multiple fan stages 272 may include three fan stages 272a, 272b, 272c. According to various embodiments, the multiple fan stages 272 may be arranged in a manner such that alternate fan stages may be counter-rotating. According to various embodiments, one or more gearbox of the multiple fan stages 272 may be configured and arranged such that alternate fan stages may be counter-rotating. According to various embodiments, the multiple fan stages 272 of the thrust fan unit may include sub-stages such as a compressor stage with or without fan blades or propellers.

According to various embodiments, the first thrust fan unit 271a may include at least one fan stage being coupled to and driven by a further fan stage via a reduction planetary gearbox. Accordingly, the at least one fan stage may be rotating at a speed different from the further fan stage.

Figure 2E:
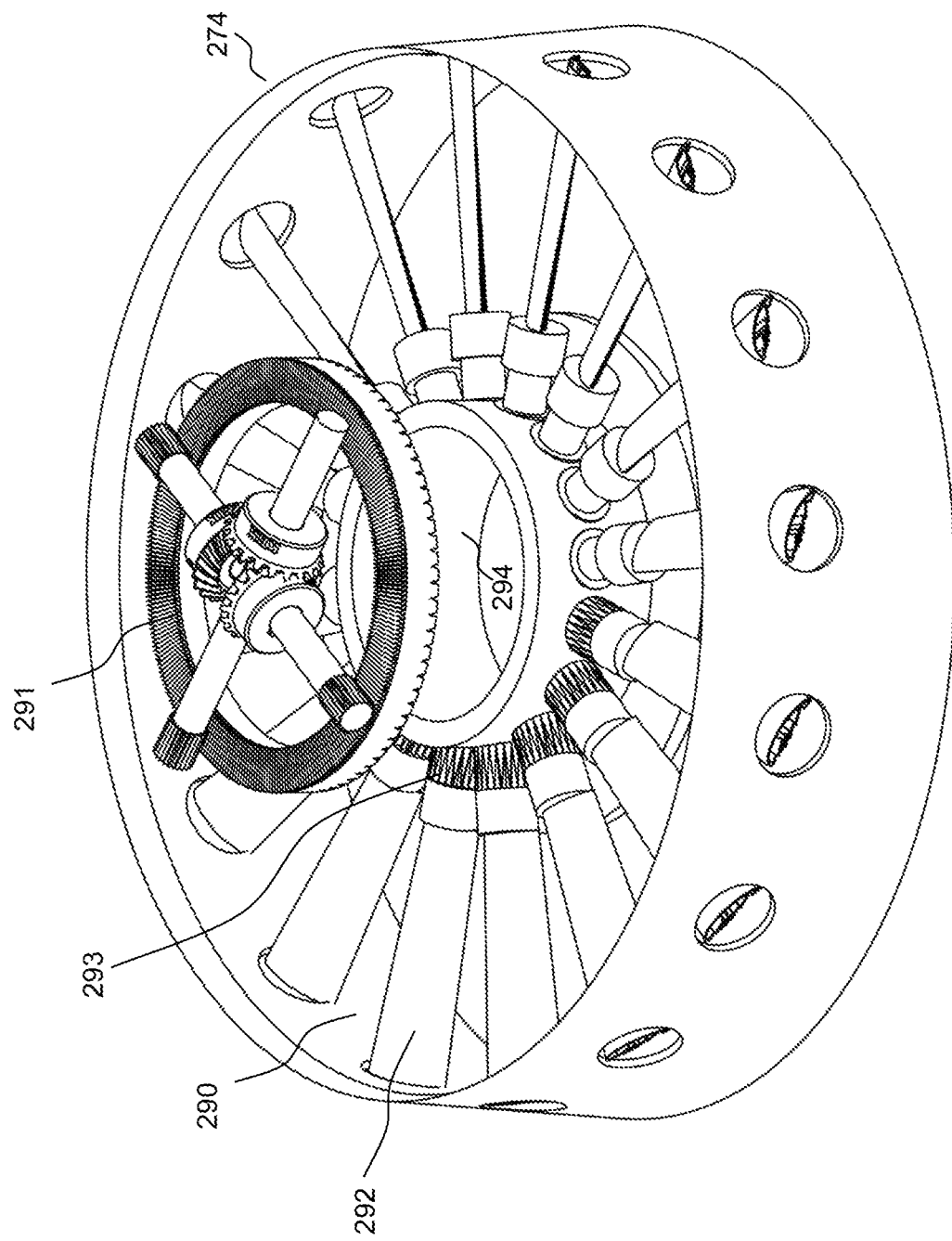
FIG. 2E shows an underside perspective view of an outlet of the first thrust fan unit of the powertrain of FIG. 2A according to various embodiments.
Figure 2F:
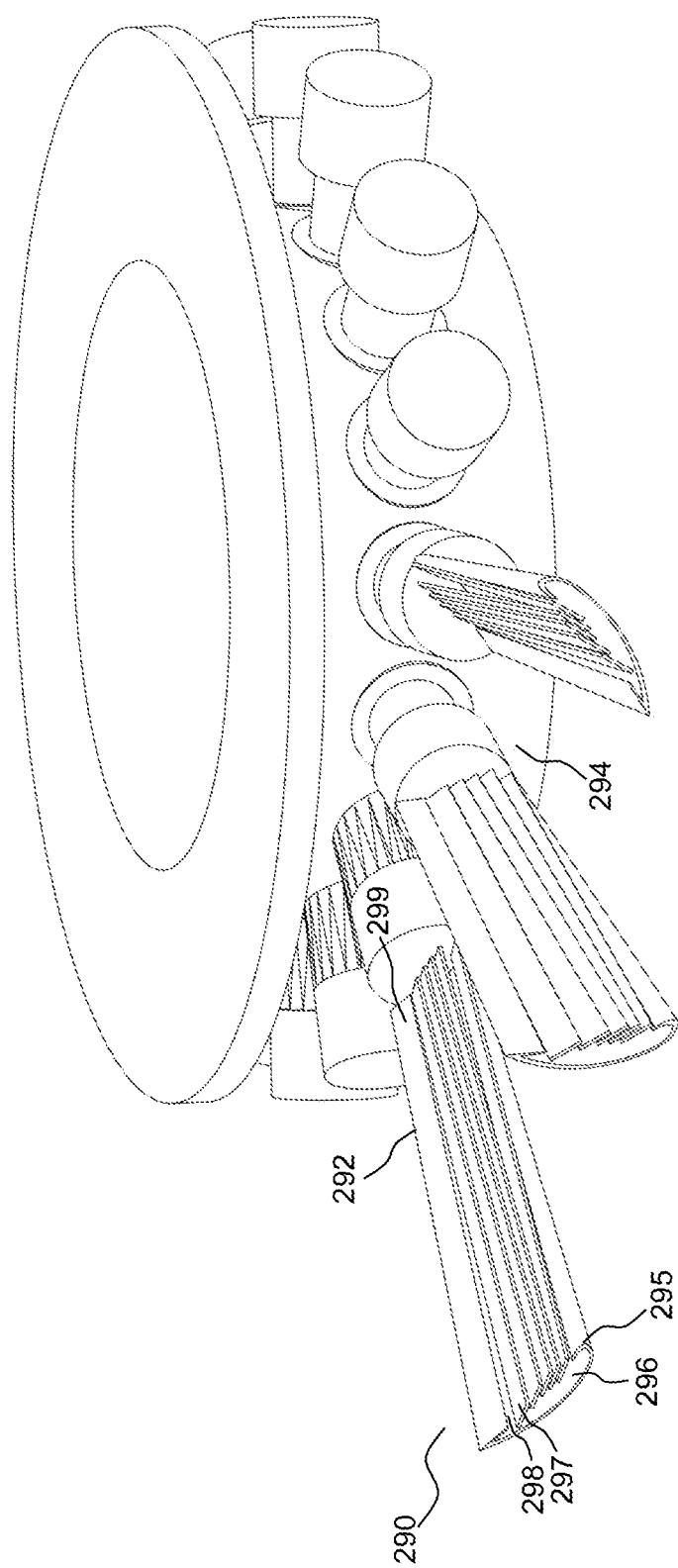
FIG. 2F shows an enlarged view of a thrust vectoring mechanism at the outlet of the first thrust fan unit of FIG. 2E according to various embodiments.

FIG. 2E shows an underside perspective view of an outlet 274 of the first thrust fan unit 271a according to various embodiments. FIG. 2F shows an enlarged view of a thrust vectoring mechanism 290 at the outlet 274 of the first thrust fan unit 271a. According to various embodiments, the first thrust fan unit 271a may include the thrust vectoring mechanism 290. According to various embodiments, the thrust vectoring mechanism 290 may be disposed at the outlet 274 of the first thrust fan unit 271a. According to various embodiments, the thrust vectoring mechanism 290 may form part of the outlet 274 of the first thrust fan unit 271a.

According to various embodiments, the thrust vectoring mechanism 290 may include a plurality of hollow vanes 292 arranged radially from a fixed hub 294 at the outlet 274 of the first thrust fan unit 271a. According to various embodiments, the fixed hub 294 may be fixedly mounted to the outlet 274 of the first thrust fan unit 271a. According to various embodiments, the plurality of hollow vanes 292 may extend radially or in the direction of the radius from the fixed hub 294.

According to various embodiments, each of the plurality of hollow vanes 292 may be rotatable about respective longitudinal axis. Accordingly, each of the plurality of hollow vanes 292 may be rotated about its own longitudinal axis so as to change an orientation of the respective hollow vanes with respect to a direction of the thrust generated by the first thrust fan unit 271a.

According to various embodiments, each of the plurality of hollow vanes 292 may include an opening 296 at a tip 295 of respective hollow vane 292. According to various embodiments, the opening 296 may be located at a distal end of the respective hollow vane 292 with respect to the fixed hub 294. According to various embodiments, the longitudinal axis of the respective hollow vane 292 may pass through the respective opening 296. According to various embodiments, the respective opening 296 may be perpendicular to the longitudinal axis of the respective hollow vane 292.

Referring to FIG. 2F, according to various embodiments, each of the plurality of hollow vanes 292 may include at least one slot 298 aligned and extending longitudinally along a vane face 299 on a first side of the respective hollow vane 292. According to various embodiments, each of the plurality of hollow vanes 292 may include the at least one slot 298, or one or more slots 298, or a plurality of slots 298. According to various embodiments, the at least one slot 298 may be a long narrow opening extending lengthwise in the vane face 299 on the first side of the respective hollow vane 292. According to various embodiments, a second side of the respective hollow vane 292 may be free of any openings or slots.

According to various embodiments, the opening 296 at the tip 295 of respective hollow vane 292 and the at least one slot 298 of the respective hollow vane 292 may provide access into an inner cavity of the respective hollow vane 292.

According to various embodiments, each of the plurality of hollow vanes 292 may be rotated about its longitudinal axis to vector or guide or change a direction of thrust so as to steer the vehicle. According to various embodiments, when the respective hollow vane 292 is rotated into a horizontal orientation with the vane face 299 facing the air flow (i.e. the vane face 299 is oriented to be perpendicular to the air flow and at the windward side of the respective hollow vane 292), the flow of air may enter the respective hollow vane 292 via the at least one slot 298 along the vane face 299 and exit from the respective hollow vane 292 via the opening 296 at the tip 295 of respective hollow vane 292. Accordingly, the change in flow of air by rotating and orientating the respective hollow vane 292 may vector or guide or change a direction of thrust for steering. According to various embodiments, when the respective hollow vane 292 is rotated into a vertical orientation with the vane face lined along the airflow (i.e. the vane face 299 is oriented to be streamline with the airflow), the air flow may generally flow over the respective hollow vane 292 without entering the respective hollow vane 292 via the at least one slot 298 along the vane face 299. Accordingly, in such orientation, the respective hollow vane 292 may not change the direction of thrust.

According to various embodiments, each of the plurality of hollow vanes 292 may include a plurality of elongated control surface slats 297 aligned and extending longitudinally along the vane face 299 of the respective hollow vane 292 to form the at least one slot 298. According to various embodiments, the plurality of elongated control surface slats 297 may be in a louver arrangement. According to various embodiments, the plurality of elongated control surface slats 297 (or at least two elongated control surface slats 297) may be placed lengthwise and parallel to each other in the louver arrangement so as to form the at least one slot 298 therebetween. According to various embodiments, the plurality of elongated control surface slats 297 may be angled in a manner such that the plurality of elongated control surface slats 297 may guide or deflect airflow through the at least one slot 298 when the respective hollow vane 292 is in the horizontal orientation, and the plurality of elongated control surface slats 297 may guide or deflect airflow to flow over the respective hollow vane 292 when the respective hollow vane 292 is in the vertical orientation. According to various embodiments, each of the plurality of elongated control surface slats 297 may have a twist profile so as to better accommodate the air flow. Accordingly, each of the plurality of elongated control surface slats 297 may have a twist along its longitudinal axis to cater for air flow.

According to various embodiments, each of the plurality of elongated control surface slats of respective hollow vane 292 may be rotatable about respective longitudinal axis. According to various embodiments, the respective hollow vane 292 may or may not be rotatable about respective longitudinal axis of the respective hollow vane 292. According to various embodiments, the plurality of elongated control surface slats of the respective hollow vane 292 may be rotated to direct or guide air flow into the respective hollow vane 292 via the at least one slot 298 along the vane face 299 such that the air flow may exit from the respective hollow vane 292 via the opening 296 at the tip 295 of respective hollow vane 292 for vectoring or guiding or changing a direction of thrust so as to steer the vehicle.

According to various embodiments, the thrust vectoring mechanism 290 may be configured to actuate a subset of the plurality of hollow vanes 292 to capture the airflow for re-directing the airflow to steer the vehicle. For example, when the plurality of hollow vanes 292 is rotatable about the respective longitudinal axis, the thrust vectoring mechanism 290 may include a actuated ring gear mechanism 291 which is in engagement with corresponding gears 293 of the subset of the plurality of hollow vanes 292 for rotating the subset of the plurality of hollow vanes 292 to capture the airflow as required. According to various embodiments, the remaining hollow vanes 292 other than the subset of the plurality of hollow vanes 292 may be free of any corresponding gears 293 such that the actuated ring gear mechanism 291 may not rotate the remaining hollow vanes 292. According to various embodiments, the subset of the plurality of hollow vanes 292 may be a group of hollow vanes 292 with respective tips 295 that are directed away from a respective side of the vehicle at which the first thrust fan unit 271a is located.

According to various embodiments, the second thrust fan unit 271b and the second converter mechanism 289b, the third thrust fan unit 271c and the third converter mechanism 289c, the fourth thrust fan unit 271d and the fourth converter mechanism 289d, may be similar to the first thrust fan unit 271a and the first converter mechanism 289a as described previously.

Figure 3A:
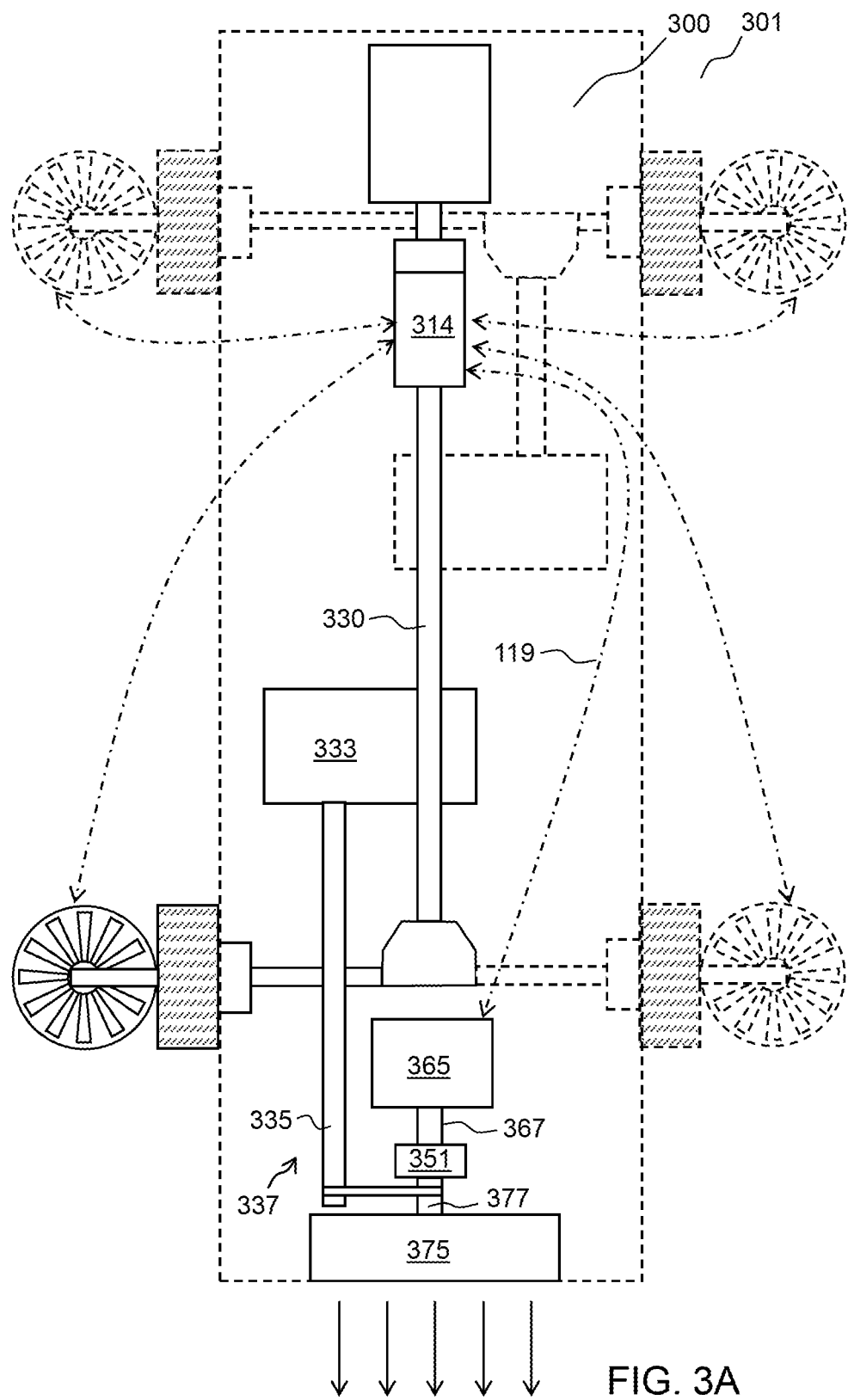
FIG. 3A shows a schematic diagram of a powertrain for a vehicle capable of land and aerial transportation according to various embodiments.

FIG. 3A shows a schematic diagram of a powertrain 300 for a vehicle 301 capable of land and aerial transportation according to various embodiments. According to various embodiments, the land and aerial transportation vehicle 301 may include the powertrain 300. According to various embodiments, the powertrain 300 of FIG. 3A includes all the features of the powertrain 100 of FIG. 1A and/or the powertrain 200 of FIG. 2A. Accordingly, all features, changes, modifications and variations that are applicable to the powertrain 100 of FIG. 1A and/or the powertrain 200 of FIG. 2A may also be applicable to the powertrain 300 of FIG. 3A. According to various embodiments, the powertrain 300 of FIG. 3A may differ from the powertrain 100 of FIG. 1A and/or the powertrain 200 of FIG. 2A in that the powertrain 300 of FIG. 3A may further include the following additional features and/or limitations.

According to various embodiments, the powertrain 300 may include a horizontal air propulsion unit 375 or at least one horizontal air propulsion unit 375 or one or more horizontal air propulsion unit 375. According to various embodiments, the horizontal air propulsion unit 375 may be configured to generate thrust for propelling the vehicle 301 forward in the air. According to various embodiments, the powertrain 300 may include an electric motor 365 coupled to the horizontal air propulsion unit 375 to drive the horizontal air propulsion unit 375. Accordingly, the electric motor 365 may transmit a torque and rotation to the horizontal air propulsion unit 375 for driving the horizontal air propulsion unit 375. According to various embodiments, the electric motor 365 may be electrically coupled to the generator 314 as represented by line 319. Accordingly, the electric motor 365 may be electrically powered by the generator 314. According to various embodiments, the electric motor 365 may be electrically coupled to a battery connected to the generator 314. According to various embodiments, the generator 314 may charge the battery for powering the electric motor 365.

Figure 3B:
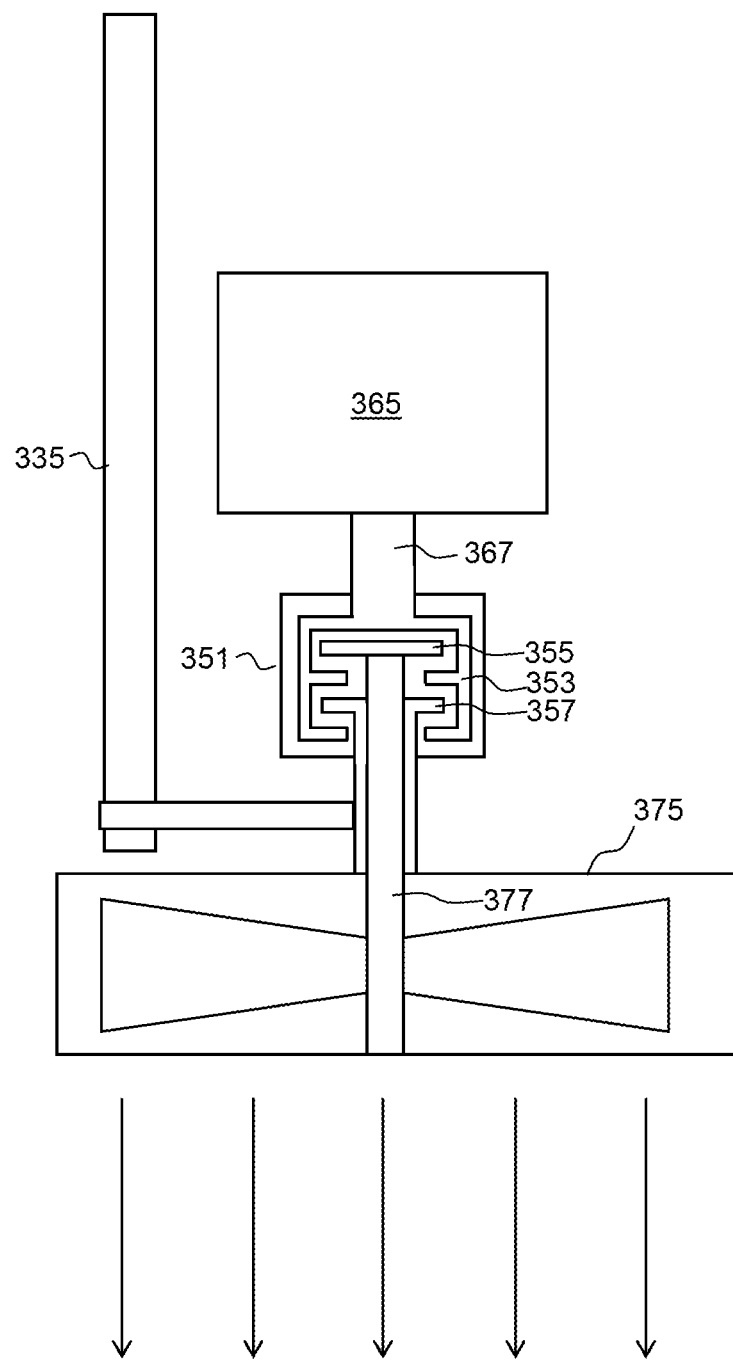
FIG. 3B shows a schematic diagram of an auxiliary clutch mechanism of the powertrain of FIG. 3A according to various embodiments.

FIG. 3B shows a schematic diagram of an auxiliary clutch mechanism 351 of the powertrain 300 of FIG. 3A according to various embodiments. According to various embodiments, the powertrain 300 may include the auxiliary clutch mechanism 351 coupled to the electric motor 365 in a manner such that a driving member 353 of the auxiliary clutch mechanism 351 may be rotatable by the electric motor 365. According to various embodiments, the auxiliary clutch mechanism 351 may include the driving member 353 which may be fixedly coupled to a driving shaft 367 of the electric motor 365 such that the driving member 353 of the auxiliary clutch mechanism 351 may rotate at the same speed as the driving shaft 367 of the electric motor 365 when the driving shaft 367 is rotated during operation of the electric motor 365. According to various embodiments, the driving shaft 367 of the electric motor 365 and the driving member 353 of the auxiliary clutch mechanism 351 may be integrally connected or joined or formed so as to function as a single rotating unit.

According to various embodiments, the horizontal air propulsion unit 375 may be coupled to a first driven member 355 of the auxiliary clutch mechanism 351. According to various embodiments, the first driven member 355 of the auxiliary clutch mechanism 351 may be coupled to the horizontal air propulsion unit 375 in a manner such that the first driven member 355 of the auxiliary clutch mechanism 351 may rotate and drive the horizontal air propulsion unit 375. According to various embodiments, horizontal air propulsion unit 375 may include a horizontal thrust fan unit. According to various embodiments, the horizontal air propulsion unit 375 in the form of the horizontal thrust fan unit may include a fan axle 377. According to various embodiments, the first driven member 355 of the auxiliary clutch mechanism 351 may be fixedly coupled to the fan axle 377 of the horizontal air propulsion unit 375 such that the first driven member 355 and the fan axle 377 of the horizontal air propulsion unit 375 may rotate together. Accordingly, the first driven member 355 of the auxiliary clutch mechanism 351 and the fan axle 377 of the horizontal air propulsion unit 375 may be integrally connected or joined or formed so as to function as a single rotating unit. According to various embodiments, the first driven member 355 of the auxiliary clutch mechanism 351 may transmit torque and rotation to the fan axle 377 of the horizontal air propulsion unit 375 for driving the horizontal air propulsion unit 375 to generate thrust.

According to various embodiments, the auxiliary clutch mechanism 351 may be operable to engage or disengage the first driven member 355 of the auxiliary clutch mechanism 351 and the driving member 353 of the auxiliary clutch mechanism 351 so as to connect or disconnect the fan axle 377 of the horizontal air propulsion unit 375 and the driving shaft 367 of the electric motor 365. Accordingly, when the first driven member 355 of the auxiliary clutch mechanism 351 is engaged with the driving member 353 of the auxiliary clutch mechanism 351, they may be locked together and spin at the same speed. Hence, the fan axle 377 of the horizontal air propulsion unit 375 and the driving shaft 367 of the electric motor 365 may be connected together by the auxiliary clutch mechanism 351 so as to rotate as a single unit, whereby the rotation of the driving shaft 367 of the electric motor 365 is transmitted to the fan axle 377 of the horizontal air propulsion unit 375. When the first driven member 355 of the auxiliary clutch mechanism 351 is disengaged from the driving member 353 of the auxiliary clutch mechanism 351, they may be separated from and independent of each other. Hence, the fan axle 377 of the horizontal air propulsion unit 375 and the driving shaft 367 of the electric motor 365 may be disconnected from each other by the auxiliary clutch mechanism 351 such that the rotation of the driving shaft 367 of the electric motor 365 is no longer transmitted to the fan axle 377 of the horizontal air propulsion unit 375.

According to various embodiments, the main drive shaft assembly 330 may be coupled to a second driven member 357 of the auxiliary clutch mechanism 351. According to various embodiments, the second driven member 357 of the auxiliary clutch mechanism 351 may be coupled to the main drive shaft assembly 330, via a mechanical connection assembly 337, in a manner such that the second driven member 357 of the auxiliary clutch mechanism 351 may rotate and drive the main drive shaft assembly 330. Accordingly, the second driven member 357 of the auxiliary clutch mechanism 351 and the main drive shaft assembly 330 may be connected or joined or assembled, via the mechanical connection assembly 337, in a manner such that the second driven member 357 of the auxiliary clutch mechanism 351 may rotate so as to serve to drive the main drive shaft assembly 330. According to various embodiments, the second driven member 357 of the auxiliary clutch mechanism 351 may transmit torque and rotation to drive the main drive shaft assembly 330.

According to various embodiments, the mechanical connection assembly 337 of the powertrain 300 may include an auxiliary drive shaft 335 coupled to the second driven member 357 of the auxiliary clutch mechanism 351 via any one or a combination of a gear or belt or chain or links or other suitable components so as to transmit torque and rotation from the second driven member 357 of the auxiliary clutch mechanism 351 to the auxiliary drive shaft 335. According to various embodiments, the mechanical connection assembly 337 of the powertrain 300 may include an auxiliary transfer case assembly 333. The auxiliary transfer case assembly 333 may couple the main drive shaft assembly 330 to the auxiliary drive shaft 355. According to various embodiments, the transfer case assembly 333 may be configured to transmit the rotation and torque from the auxiliary drive shaft 335 to the main drive shaft assembly 330. According to various embodiments, the second driven member 357 of the auxiliary clutch mechanism 351 may transmit torque and rotation to drive the main drive shaft assembly 330 via the auxiliary drive shaft 335 and the auxiliary transfer case assembly 333.

According to various embodiments, the auxiliary clutch mechanism 351 may be operable to engage or disengage the second driven member 357 of the auxiliary clutch mechanism 351 and the driving member 353 of the auxiliary clutch mechanism 351 so as to connect or disconnect the main drive shaft assembly 330 and the electric motor 365. Accordingly, when the second driven member 357 of the auxiliary clutch mechanism 351 is engaged with the driving member 353 of the auxiliary clutch mechanism 351, they may be locked together and spin at the same speed. Hence, the main drive shaft assembly 330 and the electric motor 365 may be connected together by the auxiliary clutch mechanism 351 so as to drive the main drive shaft assembly 330 using the electric motor 365, whereby the rotation of the driving shaft 367 of the electric motor 365 is transmitted to drive the main drive shaft assembly 330. When the second driven member 357 of the auxiliary clutch mechanism 351 is disengaged from the driving member 353 of the auxiliary clutch mechanism 351, they may be separated from and independent of each other. Hence, the main drive shaft assembly 330 and the electric motor 365 may be disconnected from each other by the auxiliary clutch mechanism 351 such that the rotation of the driving shaft 367 of the electric motor 365 is no longer transmitted to the main drive shaft assembly 330.

FIG. 3B is provided for illustration purposes only to explain the auxiliary clutch mechanism 351 and should not be construed to be limiting. It is understood that the configuration and arrangement of the driving member 353 of the auxiliary clutch mechanism 351, the first driven member 355 of the auxiliary clutch mechanism 351, the second driven member 357 of the auxiliary clutch mechanism 351 and the mechanical connection assembly 337 connecting the auxiliary clutch mechanism 351 to the main drive shaft assembly 330 may be in any suitable manner to serve the respective function and purposes. While in FIG. 3B, it is shown as an example that the driving member 353 of the auxiliary clutch mechanism 351, the first driven member 355 of the auxiliary clutch mechanism 351, and the second driven member 357 of the auxiliary clutch mechanism 351 may be configured and arranged such that the horizontal air propulsion unit 375 and the mechanical connection assembly 337 are connected to a same side of the auxiliary clutch mechanism 351 and the electric motor 365 is connected to an opposite side of the auxiliary clutch mechanism 351, it is understood that the auxiliary clutch mechanism 351 may be configured such that the driving member 353 of the auxiliary clutch mechanism 351, the first driven member 355 of the auxiliary clutch mechanism 351, and the second driven member 357 of the auxiliary clutch mechanism 351 may be configured and arranged such that the mechanical connection assembly 337 and the electric motor 365 may be connected to a same side of the auxiliary clutch mechanism 351 and the horizontal air propulsion unit 375 may be connected to an opposite side of the auxiliary clutch mechanism 351.

Figure 4:
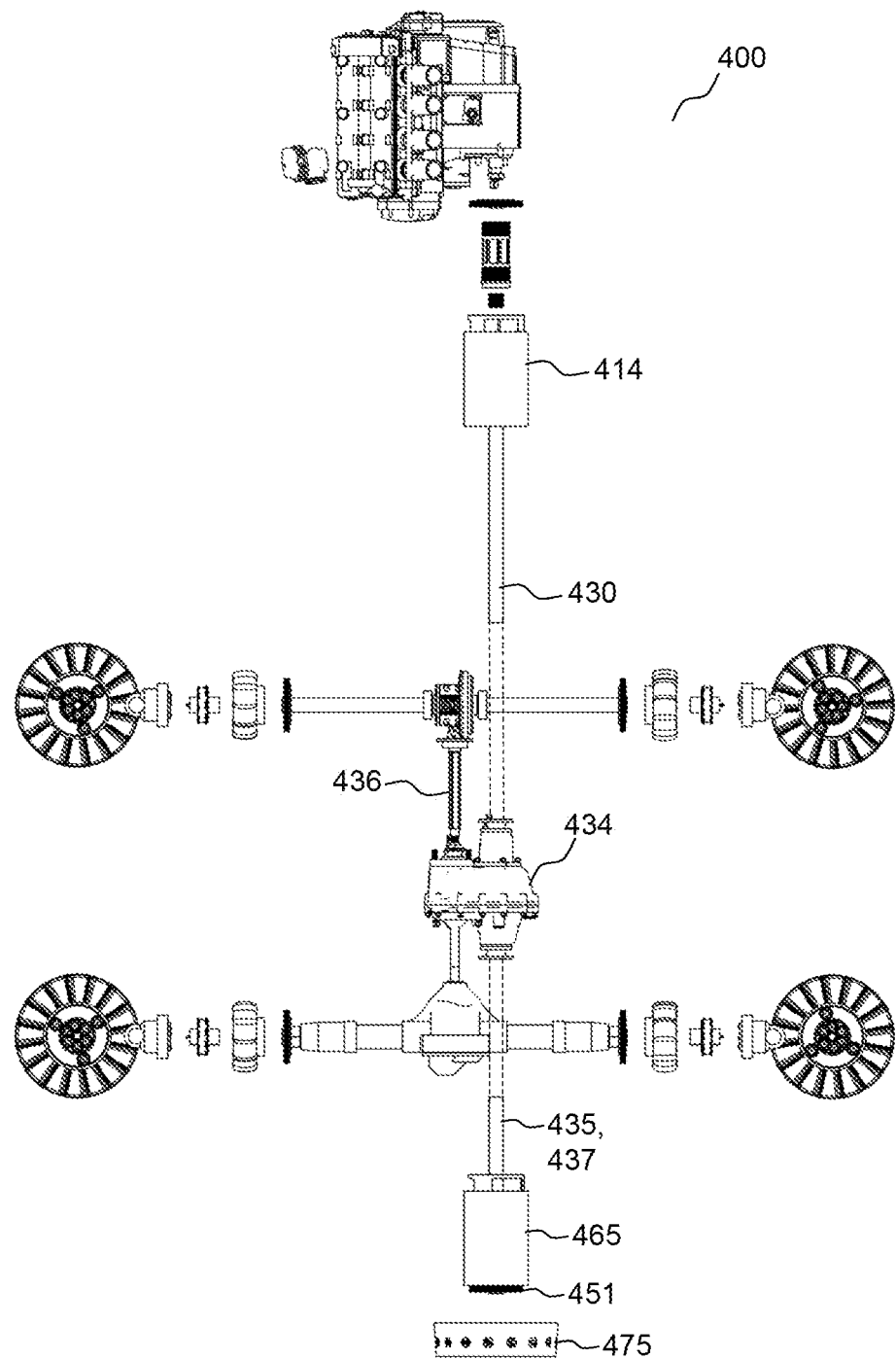
FIG. 4 shows an exploded top view of a powertrain for a vehicle capable of land and aerial transportation according to various embodiments.

FIG. 4 shows an exploded top view of a powertrain 400 for a vehicle capable of land and aerial transportation according to various embodiments. According to various embodiments, the land and aerial transportation vehicle may include the powertrain 400. According to various embodiments, the powertrain 400 of FIG. 4 includes all the features of the powertrain 100 of FIG. 1A and/or the powertrain 200 of FIG. 2A. Accordingly, all features, changes, modifications and variations that are applicable to the powertrain 100 of FIG. 1A and/or the powertrain 200 of FIG. 2A may also be applicable to the powertrain 400 of FIG. 4. According to various embodiments, the powertrain 400 of FIG. 4 may be a variant of the powertrain 300 of FIG. 3A. According to various embodiments, the powertrain 400 of FIG. 4 may differ from the powertrain 300 of FIG. 3A in that the powertrain 400 of FIG. 4 may further include the following variations and/or modifications.

According to various embodiments, the powertrain 400 may, similar to the powertrain 300 of FIG. 3A, include a horizontal air propulsion unit 475 or at least one horizontal air propulsion unit 475 or one or more horizontal air propulsion unit 475. According to various embodiments, the powertrain 400 may, similar to the powertrain 300 of FIG. 3A, include an electric motor 465 coupled to the horizontal air propulsion unit 475 to drive the horizontal air propulsion unit 475. Accordingly, the electric motor 465 may transmit a torque and rotation to the horizontal air propulsion unit 475 for driving the horizontal air propulsion unit 475. According to various embodiments, the electric motor 465 may be electrically coupled to a battery (not shown). According to various embodiments, the battery may be connected to and charged by the generator 414. Accordingly, the electric motor 465 may be electrically powered by the battery.

According to various embodiments, the powertrain 400 may, similar to the powertrain 300 of FIG. 3A, include an auxiliary clutch mechanism 451 coupled to the electric motor 365 in a manner similar to that between auxiliary clutch mechanism 351 and the electric motor 365 of FIG. 3A. According to various embodiments, the horizontal air propulsion unit 475 may also be coupled to the auxiliary clutch mechanism 451 in a manner similar to that between the horizontal air propulsion unit 375 and the auxiliary clutch mechanism 351 of FIG. 3A. According to various embodiments, the auxiliary clutch mechanism 451 may, similar to the auxiliary clutch mechanism 351 of FIG. 3A, be operable to engage or disengage the auxiliary clutch mechanism 451 so as to connect or disconnect the horizontal air propulsion unit 475 and the electric motor 465.

According to various embodiments, the main drive shaft assembly 430 of the powertrain 400 may, similar to the main drive shaft assembly 330 of the powertrain 300, be coupled to the auxiliary clutch mechanism 451, via a mechanical connection assembly 437, in a manner such that the auxiliary clutch mechanism 451 may be engaged or disengaged to drive the main drive shaft assembly 430. According to various embodiments, the auxiliary clutch mechanism 451 may be engaged in a manner so as to transmit torque and rotation from the electric motor 465 to drive the main drive shaft assembly 430.

According to various embodiments, the powertrain 400 may differ from the powertrain 300 of FIG. 3A in that the mechanical connection assembly 437 of the powertrain 400 may include an auxiliary drive shaft 435 coupling the auxiliary clutch mechanism 451 to the transfer case assembly 434, which also in connection with the secondary drive shaft assembly 436 and the main drive shaft assembly 430. According to various embodiments, the transfer case assembly 434 may be configured to transmit a rotation and torque, which originated from the electric motor 465, from the auxiliary drive shaft 435 to the main drive shaft assembly 430 and the secondary drive shaft assembly 436. According to various embodiments, the auxiliary clutch mechanism 451 may, similar to the auxiliary clutch mechanism 351 of FIG. 3A, be operable to engage or disengage so as to connect or disconnect the main drive shaft assembly 430 and the electric motor 465.

Various embodiments have provided a vehicle capable of land and aerial transportation, and a land and aerial transportation vehicle which have addressed the various issues previously identified. Various embodiments differ from conventional powertrain of a land vehicle in that it is not based on a single clutch for a single drive shaft. In various embodiments, there is provided a two-tier clutch arrangement or a multi-tier clutch arrangement, i.e. at least a first tier clutch mechanism at the power generation side of the powertrain and at least a second tier clutch mechanism at the propulsion side of the powertrain, that governs both the mechanical operations and electrical operations for land and aerial transportation, thus allowing multi-modes or configurations of operation when required. For example, the multi-modes of operation may include four different modes of operations namely, flight in electrical mode, flight in mechanical mode, land travel in electrical mode, and land travel in mechanical mode. As another example, the multi-modes of operation may include six different modes of operations namely, namely, flight in electrical mode, flight in mechanical mode, flight in hybrid mode, land travel in electrical mode, land travel in mechanical mode, and land travel in hybrid mode.

According to various embodiments, for flight in electrical mode, flight using electrical systems may be achieved with the use of electrical power generated from the generator systems to supply power to the electrical motors, for example two or three or four or five or six or more motors, which in turn generates thrust from the thrust fans that are attached to the motors via a planetary drive, connected via a clutch. According to various embodiments, there is at least one thrust fan which is positioned to provide thrust in the horizontal axis, and at least one thrust fan is positioned to provide thrust in the vertical axis. According to various embodiments, all thrust fans may be of compressive nature, where the output pressure is higher than that of the input pressure. According to various embodiments, when there are six electrical motors and six thrust fans configuration, two of the thrust fans may be positioned to provide thrust in the horizontal axis, and four of the thrust fans may be positioned to provide thrust in the vertical axis. According to various embodiments, particularly for the vertical facing thrust fans, they may have a thrust vectoring mechanism including a plurality of vanes which are rotatable about respective longitudinal axis via the use of a ring gear, actuated via an electrical actuator. This action may concurrently open up a set of side facing slots to allow airflow to exit by the side, which may allow lateral movement.

According to various embodiments, for flight in mechanical mode, flight using mechanical systems may be achieved with the meshing of the mechanical transmission systems for land travel to the secondary flight transmission systems via the two-tier or multi-tier clutch arrangement, where the same thrust fans used in the electrical flight mode are operated via a direct gear drive assembly.

According to various embodiments, for land travel in electrical mode, the motors that are connected to the thrust fans providing thrust in the horizontal axis may also be connected to the drive axes of the wheels via the same two-tier or multi-tier clutch arrangement.

According to various embodiments, for land travel in mechanical mode, the mechanical transmission systems for land travel may be connected to the wheels via the same two-tier or multi-tier clutch arrangement.

While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within.

The invention claimed is:

1. A powertrain for a vehicle capable of land and aerial transportation, the powertrain comprising:
  an engine having at least one output shaft;
  a primary clutch mechanism coupled to the at least one output shaft of the engine in a manner such that a driving member of the primary clutch mechanism is rotatable by the at least one output shaft of the engine;
  a main drive shaft assembly coupled to a driven member of the primary clutch mechanism, wherein the primary clutch mechanism is operable to engage or disengage the driven member of the primary clutch mechanism and the driving member of the primary clutch mechanism so as to connect or disconnect the main drive shaft assembly and the at least one output shaft of the engine;
  an axle shaft coupled transversely to the main drive shaft assembly and driven by the main drive shaft assembly;
  a secondary clutch mechanism coupled to an end of the axle shaft in a manner such that a driving member of the secondary clutch mechanism at the end of the axle shaft is rotatable by the axle shaft;
  a drive wheel coupled to a first driven member of the secondary clutch mechanism, wherein the secondary clutch mechanism is operable to engage or disengage the first driven member of the secondary clutch mechanism and the driving member of the secondary clutch mechanism so as to connect or disconnect the drive wheel and the axle shaft; and
  an air propulsion unit coupled to a second driven member of the secondary clutch mechanism, wherein the secondary clutch mechanism is operable to engage or disengage the second driven member of the secondary clutch mechanism and the driving member of the secondary clutch mechanism so as to connect or disconnect the air propulsion unit and the axle shaft.

2. The powertrain as claimed in claim 1, further comprising a generator coupled to the engine in a manner so as to be powered by the engine.

3. The powertrain as claimed in claim 2,
  wherein the primary clutch mechanism comprises a further driven member,
  wherein a rotor of the generator is coupled to the further driven member of the primary clutch mechanism,
  wherein the primary clutch mechanism is operable to engage or disengage the further driven member of the primary clutch mechanism and the driving member of the primary clutch mechanism so as to connect or disconnect the rotor of the generator and the at least one output shaft of the engine.

4. The powertrain as claimed in claim 2, wherein a connection arrangement between the air propulsion unit and the secondary clutch mechanism comprises:
  a transfer shaft with a first end coupled to the second driven member of the secondary clutch mechanism;
  a planetary gear set with a sun gear coupled to a second end of the transfer shaft; and
  an electric hub motor mounted to the transfer shaft, the electric hub motor operable to rotate a hub motor body relative to the transfer shaft and about a longitudinal axis of the transfer shaft,
  wherein a ring gear of the planetary gear set is coupled to the hub motor body,
  wherein a planet carrier connecting respective centres of planet gears of the planetary gear set is coupled to the air propulsion unit, and
  wherein the electric hub motor is electrically coupled to the generator.

5. The powertrain as claimed in claim 4, wherein the air propulsion unit comprises a thrust fan unit oriented with a fan-blade-rotational-axis perpendicular to a rotational axis of the drive wheel in a manner so as to be capable of generating a thrust providing vertical lift.

6. The powertrain as claimed in claim 5, wherein a converter mechanism is connected between the thrust fan unit and the second driven member of the secondary clutch mechanism, wherein the converter mechanism converts a rotation about a rotational axis of the second driven member to a rotation about the fan-blade-rotational-axis of the thrust fan unit.

7. The powertrain as claimed in claim 6, wherein the connection arrangement further comprises the converter mechanism, the converter mechanism being connected between the planet carrier of the planetary gear set and the thrust fan unit.

8. The powertrain as claimed in claim 7, wherein the converter mechanism comprises a bevel gear arrangement or a worm gear arrangement or a chain drive arrangement.

9. The powertrain as claimed in claim 5, wherein the thrust fan unit comprises multiple fan stages arranged in series.

10. The powertrain as claimed in claim 9, wherein the multiple fan stages may be arranged in a manner such that alternate fan stages may be counter-rotating.

11. The powertrain as claimed in claim 9, wherein the thrust fan unit comprises at least one fan stage being coupled to and driven by a further fan stage via a reduction planetary gearbox.

12. The powertrain as claimed in claim 5, wherein the thrust fan unit comprises a thrust vectoring mechanism.

13. The powertrain as claimed in claim 12, wherein the thrust vectoring mechanism comprises a plurality of hollow vanes arranged radially from a fixed hub at an outlet of the thrust fan unit, wherein each of the plurality of hollow vanes comprises:
  an opening at a tip of respective hollow vane; and
  at least one slot extending longitudinally along a vane face on one side of the respective hollow vane,
  wherein the opening and the at least one slot provide access into an inner cavity of the respective hollow vane.

14. The powertrain as claimed in claim 13, wherein each of the plurality of hollow vanes comprises a plurality of elongated control surface slats extending longitudinally along the vane face of the respective hollow vane to form the at least one slot, wherein the plurality of elongated control surface slats are in a louver arrangement.

15. The powertrain as claimed in claim 14, wherein each of the plurality of elongated control surface slats may have a twist profile.

16. The powertrain as claimed in claim 14, wherein each of the plurality of elongated control surface slats may be rotatable about respective longitudinal axis.

17. The powertrain as claimed in claim 13, wherein each of the plurality of hollow vanes may be rotatable about respective longitudinal axis.

18. The powertrain as claimed in claim 2, further comprising:
 a horizontal air propulsion unit; and
 an electric motor coupled to the horizontal air propulsion unit to drive the horizontal air propulsion unit,
 wherein the electric motor is electrically coupled to the generator.

19. The powertrain as claimed in claim 18, further comprising an auxiliary clutch mechanism coupled to the electric motor in a manner such that a driving member of the auxiliary clutch mechanism is rotatable by the electric motor,
 wherein the horizontal air propulsion unit is coupled to a first driven member of the auxiliary clutch mechanism, wherein the auxiliary clutch mechanism is operable to engage or disengage the first driven member of the auxiliary clutch mechanism and the driving member of the auxiliary clutch mechanism so as to connect or disconnect the horizontal air propulsion unit and the electric motor, and
 wherein the main drive shaft assembly is coupled to a second driven member of the auxiliary clutch mechanism, wherein the auxiliary clutch mechanism is operable to engage or disengage the second driven member of the auxiliary clutch mechanism and the driving member of the auxiliary clutch mechanism so as to connect or disconnect the main drive shaft assembly and the electric motor.

20. A land and aerial transportation vehicle, comprising:
 a powertrain for the land and aerial transportation vehicle, the powertrain comprising;
 an engine having at least one output shaft;
 a primary clutch mechanism coupled to the at least one output shaft of the engine in a manner such that a driving member of the primary clutch mechanism is rotatable by the at least one output shaft of the engine;
 a main drive shaft assembly coupled to a driven member of the primary clutch mechanism, wherein the primary clutch mechanism is operable to engage or disengage the driven member of the primary clutch mechanism and the driving member of the primary clutch mechanism so as to connect or disconnect the main drive shaft assembly and the at least one output shaft of the engine;
 an axle shaft coupled transversely to the main drive shaft assembly and driven by the main drive shaft assembly;
 a secondary clutch mechanism coupled to an end of the axle shaft in a manner such that a driving member of the secondary clutch mechanism at the end of the axle shaft is rotatable by the axle shaft;
 a drive wheel coupled to a first driven member of the secondary clutch mechanism, wherein the secondary clutch mechanism is operable to engage or disengage the first driven member of the secondary clutch mechanism and the driving member of the secondary clutch mechanism so as to connect or disconnect the drive wheel and the axle shaft;
 an air propulsion unit coupled to a second driven member of the secondary clutch mechanism, wherein the secondary clutch mechanism is operable to engage or disengage the second driven member of the secondary clutch mechanism and the driving member of the secondary clutch mechanism so as to connect or disconnect the air propulsion unit and the axle shaft;
 a plurality of wheels, wherein at least one of the wheels being the drive wheel which is provided for driving the vehicle on land; and
 at least the one air propulsion unit for providing lift and/or forward propulsion for aerial travel of the vehicle.

\* \* \* \* \*